(12) United States Patent
Jung

(10) Patent No.: US 11,481,556 B2
(45) Date of Patent: Oct. 25, 2022

(54) ELECTRONIC DEVICE, METHOD, AND COMPUTER PROGRAM WHICH SUPPORT NAMING

(71) Applicant: Chul Hwan Jung, Seoul (KR)

(72) Inventor: Chul Hwan Jung, Seoul (KR)

( * ) Notice: Subject to any disclaimer, the term of this patent is extended or adjusted under 35 U.S.C. 154(b) by 0 days.

(21) Appl. No.: 17/607,491

(22) PCT Filed: Apr. 29, 2020

(86) PCT No.: PCT/KR2020/005640
§ 371 (c)(1),
(2) Date: Oct. 29, 2021

(87) PCT Pub. No.: WO2020/222515
PCT Pub. Date: Nov. 5, 2020

(65) Prior Publication Data
US 2022/0138426 A1    May 5, 2022

(30) Foreign Application Priority Data
Apr. 30, 2019 (KR) .................... 10-2019-0050630

(51) Int. Cl.
*G06F 17/00* (2019.01)
*G06F 40/295* (2020.01)
(Continued)

(52) U.S. Cl.
CPC .......... *G06F 40/295* (2020.01); *G06F 40/263* (2020.01); *G06F 40/30* (2020.01); *G06F 40/53* (2020.01); *G06N 20/00* (2019.01)

(58) Field of Classification Search
None
See application file for complete search history.

(56) References Cited

U.S. PATENT DOCUMENTS 8,050,924 B2 * 11/2011 McCuller .............. G10L 13/033
704/254
8,359,200 B2 * 1/2013 McCuller .............. G10L 13/033
704/254

(Continued)

FOREIGN PATENT DOCUMENTS

JP       2007-241900 A    9/2007
KR   10-2002-0025511 A    4/2002
(Continued)

OTHER PUBLICATIONS

International Search Report dated Aug. 13, 2020 in corresponding International application PCT/KR2020/005640; 2 pages.
(Continued)

*Primary Examiner* — Satwant K Singh
(74) *Attorney, Agent, or Firm* — Maier & Maier, PLLC

(57) ABSTRACT

A naming support system is provided that includes a processing unit that receives first language name information input from a user, determines name evaluation's basic information about the first language name information, and generates and transmits name's evaluation information to an output unit based on a target language which includes at least one of a plurality of languages for the name evaluation's basic information, wherein the first language name information includes at least one of character notation information of a first language name, pronunciation information of a first language name, or desired information for
(Continued)

a first language name, and the name evaluation's basic information includes the first language name information.

15 Claims, 23 Drawing Sheets

(51) Int. Cl.
*G06N 20/00* (2019.01)
*G06F 40/53* (2020.01)
*G06F 40/263* (2020.01)
*G06F 40/30* (2020.01)

(56) References Cited

U.S. PATENT DOCUMENTS

| | | | |
|---|---|---|---|
| 8,977,536 B2* | 3/2015 | Och | G06F 40/44 704/7 |
| 2010/0131261 A1* | 5/2010 | Lin | G06F 40/45 704/7 |
| 2012/0330990 A1* | 12/2012 | Chen | G06F 16/3322 707/E17.14 |

FOREIGN PATENT DOCUMENTS

| | | |
|---|---|---|
| KR | 10-2007-0119076 A | 12/2007 |
| KR | 10-1049358 B1 | 7/2011 |
| KR | 10-2013-0131657 A | 12/2013 |
| KR | 10-2014-0123654 A | 10/2014 |
| KR | 10-2017-0000468 A | 1/2017 |
| KR | 10-2018-0134709 A | 12/2018 |

OTHER PUBLICATIONS

Notice of Allowance dated Oct. 22, 2021 in corresponding Korean application No. 10-2020-0041269; 2 pages.
Notification of Reason for Refusal dated Jun. 11, 2021 in corresponding Korean application No. 10-2020-0041269; 7 pages.
Notification of Reason for Refusal dated Aug. 27, 2021 in corresponding Korean application No. 10-2020-0041269; 2 pages.

* cited by examiner

ELECTRONIC DEVICE, METHOD, AND COMPUTER PROGRAM WHICH SUPPORT NAMING

FIELD OF THE INVENTION

Embodiments of the present disclosure relate to an electronic device for supporting naming, a naming system control method, and a computer program for performing a naming system control method.

DESCRIPTION OF THE RELATED ART

As international exchanges become more active, it is becoming important to check in advance whether a name is negatively recognized in various other language cultures and whether it can be used without any restrictions when naming peaple's name, product names, and company names. For this reason, when a person's name, company name, or brand, etc. named based on a particular language is used in another language and culture, it may be difficult to use due to differences in language and culture or may be perceived differently from what was originally intended, and thus a separate name may be created and used in a different language culture. In addition, due to differences in computer character input/output systems, laws, culture, etc. in various countries, sometimes a name already determined in a country cannot be used in other countries. In this regard, there is a need to name a commonly-usable name in multiple countries. In addition, in naming names that can be commonly used in various language cultures, or in many countries, a vast amount of expertises, such as knowledge, culture, habits, statutes, and computer text input/output systems, of many countries' languages are required, and therefore, it is difficult to make a name that can be used in multiple language cultures or in multiple countries in consideration of various aspects of the naming. In addition, it is common for a name candidate to be selected and then subjected to a procedure of verifying whether or not there is a possibility that the name may be negatively recognized. However, due to limited time and verification personnel, verification is often limited, and therefore, after a name is completed and actually used, negative recognition of the name is often recognized belatedly.

Problems to be Solved of the Invention

Embodiments of the present disclosure are intended to provide a device, method, and computer program for supporting the naming of a name that is usable without inconvenience in a plurality of language cultures or a plurality of countries and is not negatively recognized when naming a person, a business, a brand, a product, a service, or the like.

In addition, embodiments of the present disclosure are intended to provide a system, device, user interface, and computer program for supporting naming of a name that is usable without inconvenience in a plurality of language cultures or a plurality of countries and is not negatively recognized based on vast basic information.

Embodiments of the present disclosure are also intended to provide a device, method, and computer program for collecting and utilizing information for a name's evaluation utilizing a collective intelligence and a group evaluation system.

In addition, embodiments of the present disclosure are intended to provide a device, method, and computer program for supporting Chinese character naming, which is usable in various Chinese character cultured countries when naming Chinese character names without any difficulty in the language use in terms of usability of meaning, recognition, computer input and output, and the like.

SUMMARY OF THE INVENTION

In one aspect, it is provided an electronic device comprising a processing unit that receives first language name information input from a user, determines name evaluation's basic information about the first language name information, and generates and transmits name's evaluation information to an output unit based on a target language which includes at least one of a plurality of languages for the name evaluation's basic information, wherein the first language name information includes at least one of character notation information of the first language name, pronunciation information of the first language name, or desired information for the first language name, and wherein the name evaluation's basic information includes the first language name information.

The name evaluation's basic information may further comprise at least one of the following information that does not overlap with the first language name information: i) pronunciation information of the first language name; ii) character notation information of the first language name; iii) pronunciation information of a second language name corresponding to i) or ii) above; iv) character notation information of a second language name corresponding to i) or ii) above. The processing unit is input with naming basic information and the naming basic information is included in the name evaluation's basic information, and the naming basic information includes at least one or a combination of a target language, a target country, a gender, a date of birth, and a time of birth.

The name's evaluation information may include at least one of language-by-language usage aspect evaluation information, nameology evaluation information, statute evaluation information, computer character input/output tool evaluation information, or a name evaluation opinion input by another user.

The language-by-language usage aspect evaluation information may include at least one of the meaning information of a word recognized by name evaluation's basic information or a pronunciation difficulty based on the target language.

The name's evaluation information may include at least one of the meaning information of a word or a pronunciation difficulty, based on the voice pronunciation information of a combination of a name and a word used for calling the name, in at least one of a plurality of languages.

The Chinese character's usage aspect evaluation information may include at least one of the meaning of Chinese characters included in the Chinese character notation of a name, a meaning of Chinese characters, a pronunciation of Chinese character, a pronunciation of the combination of Chinese characters, a common-use Chinese character information, and a person's name-use Chinese characters information.

The electronic device may further includes a database storing at least one of language-by-language information for name evaluation or country-by-country language information, the processing unit generates the name's evaluation information based on the information stored in the database, and a user who adds data utilized for name evaluation to the database, or contributes to further evaluation or reliability evaluation of existing information of the database is given a monetary benefit or a benefit associated with the use of name evaluation services. The processing unit may control the output unit to request evaluation information for the name evaluation's basic information to a second client device when an evaluation request for the first language name information is received from a first client device, and output the name's evaluation information when the evaluation information is received from the second client device.

The processing unit may input the name evaluation's basic information of the first language name to an artificial neural network model to obtain name's evaluation information based on at least one second language from the artificial neural network model.

In another aspect, it is provided a naming system control method performed by an electronic device, the method comprising: receiving first language name information input from a user; determining name evaluation's basic information about the first language name information; and generating name's evaluation information for the name evaluation's basic information based on a target language including at least one of a plurality of languages, and transmitting the name's evaluation information to an output unit, wherein the first language name information includes at least one of character notation information of the first language name, pronunciation information of the first language name, or desired information for the first language name, and wherein the name evaluation's basic information includes the first language name information.

In another aspect, it is provided a computer program stored in a storage medium for executing a naming system control method performed by an electronic device, the naming system control method comprising: receiving first language name information input from a user; determining name evaluation's basic information about the first language name information; and generating name's evaluation information for the name evaluation's basic information based on a target language including at least one of a plurality of languages, and transmitting the name's evaluation information to an output unit, wherein the first language name information includes at least one of character notation information of the first language name, pronunciation information of the first language name, or desired information for the first language name, and wherein the name evaluation's basic information includes the first language name information. Further, it is provided an electronic device, comprising: a processing unit that generates Chinese character's usage information in a second country of at least one of a plurality of Chinese character cultured countries for a first-country Chinese character name of the plurality of Chinese character cultured countries; and an output unit that outputs Chinese character's usage information in the second country for the first-country Chinese character name.

The Chinese character's usage information may include at least one of the information as to whether the Chinese characters used in the first-country Chinese character name are identical or similar to the Chinese characters used in the second country, and the information as to whether the individual Chinese character or the combination of the Chinese characters used in the first-country Chinese character name is utilized as name-use in the second country.

The Chinese character's usage information may include second-country based gender preference information for the individual Chinese character or the combination of the Chinese characters used in the first-country Chinese character name.

The Chinese character's usage information may include second-country based meaning information for a Chinese character or a combination of Chinese characters consisting of the first-country Chinese character name.

The Chinese character's usage information may include second-country based pronunciation information for the first-country Chinese character name.

The Chinese character's usage information may include second-country based information on whether or not there is a possibility of negative recognition for the pronunciation of the first-country Chinese character name in the second country.

The Chinese character's usage information may include information as to whether the first-country character name can be input/output by a computer character input/output tool for the language of the second country.

The electronic device further includes an input unit that receives the first-country Chinese character name, and the processing unit which generates Chinese character's usage information at the second country for the received first-country Chinese character name.

The electronic device further includes an input unit that receives Chinese character name's desired information, and a processing unit which can generate first-country Chinese character name candidates that meet the input Chinese character name's desired information condition based on the Chinese character's usage information.

The Chinese character name desired information may be information about first-country Chinese character names which is usable in the second country equally or similarly.

When an evaluation request for a first-country Chinese character name of the first country is received from a first client device, the processing unit may request an evaluation information for at least one second-country Chinese character name to the first client device. If the evaluation information for the at least one second-country Chinese character name from the first client device, the process unit may control the output unit to output the second-country Chinese character's usage information for the first-country Chinese character name The electronic device may further include a database that stores country-by-country Chinese character information, and a processing unit which can generate the Chinese character's usage information based on the country-by-country Chinese character information stored in the database, and provide benefits for use of a name evaluation service to a user who has input country-by-country Chinese character information to be added to the database.

In another aspect, it is provided a method of controlling a naming system, the method comprising: generating second-country basis Chinese character's usage information for a first-country Chinese character name; and outputting the second-country basis Chinese character's usage information for the first-country Chinese character name.

In another aspect, it is provided a computer program comprising a storage medium storing computer program which, when executed by a processor, performs operations of a naming system control method. The naming system control method may comprise: generating second-country basis Chinese character's usage information for a first-country Chinese character name; and outputting the second-country basis Chinese character's usage information for the first-country Chinese character name.

In another aspect, it is provided an electronic device comprising of a receiver unit for receiving a first Chinese cultured country name and a second Chinese cultured country name selected by a user, a processing unit that generates the information as to Chinese character or a combination of the Chinese characters commonly used as a person's name in the first country and the second country, and an output unit that outputs the generated information.

In another aspect, it is provided a naming system comprising a communication unit, a processing unit; and a database. The processing unit transmits, via the communication unit, to-be-evaluated name information including at least one of the pronunciation or the notation of to-be-evaluated name to a terminal of a participant, receives, via the communication unit, a name's evaluation result of the participant for the to-be-evaluated name information, stores the name's evaluation result received from the terminal of the participant in the database, and gives evaluation compensation to the participant.

The processing unit may receive language knowledge information of the participant via the communication unit, and determine, based on the language knowledge information, the to-be-evaluated name notation corresponding to the language in which the participant has knowledge as to-be-evaluated information.

The evaluation compensation for the participant may be a benefit as to name evaluation for to-be-evaluated name input by the participant.

When the participant evaluates a specific part of pronunciation or notation of the to-be-evaluated name, the participant may select the specific part.

The evaluation result may include an image or associated meaning for the to-be-evaluated name information.

The processing unit may use data including the to-be-evaluated name information and the evaluation result as learning data for machine learning model.

The processing unit may input the to-be-evaluated name information to a machine learning to model to obtain first name's evaluation information. And the processing unit may re-learn the machine learning model based on the to-be-evaluated name information and second name's evaluation information received from the participant terminal to update the machine learning model.

In another aspect, it is provided a naming system control method consisting of transmitting to-be-evaluated name information including at least one of the pronunciation or the notation of to-be-evaluated name to a terminal of a participant, receiving a name's evaluation result of the participant for the to-be-evaluated name information, storing the name's evaluation result received from the terminal of the participant in the database, and giving evaluation compensation to the participant.

The naming system control method may further comprise the step of receiving language knowledge information of the participant, and determining, based on the language knowledge information, the to-be-evaluated name notation corresponding to the language in which the participant has knowledge as to-be-evaluated information.

The evaluation result may include an image or associated meaning for the to-be-evaluated name notation.

The method may further include the steps of inputting the to-be-evaluated name information to a machine learning model to obtain first name's evaluation information, re-learning the machine learning model based on the to-be-evaluated name information and second name's evaluation information received from the participant terminal to update the machine learning model.

In another aspect, it is provided a computer program stored in a storage medium for executing a naming system control method performed by an electronic device, the naming system control method comprising of transmitting to-be-evaluated name information including at least one of the pronunciation or the notation of to-be-evaluated name to a terminal of a participant, receiving a name's evaluation result of the participant for the to-be-evaluated name information, storing the name's evaluation result received from the terminal of the participant in the database, and giving evaluation compensation to the participant.

Advantages of the Invention

According to embodiments of the present disclosure, it is possible to provide a device, method, and computer program for supporting the naming of various objects which are not negatively recognized and/or usable without inconvenience in a plurality of language cultures or a plurality of countries.

In addition, according to embodiments of the present disclosure, it is possible to provide a device, method, and computer program supporting Chinese character naming. In particular, it supports naming of Chinese characters without problems in terms of usability such as meaning, recognition, and computer input/output.

Moreover, according to embodiments of the present disclosure, there is an effect of being able to provide a system, a device, a user interface, and a computer program for supporting naming based on huge amount of basic information.

Furthermore, according to embodiments of the present disclosure, there is an effect of providing a device, method, and computer program for collecting and utilizing evaluation information for a name by utilizing collective intelligence. Embodiments of the present disclosure have the effect of collecting assessed name information by using collective intelligence and re-evaluating the reliability of each evaluation information, thereby obtaining information on recognition, image, and the like, for a predetermined name. Thus, it is able to collect verified information for names that reflect accurate and up-to-date usage patterns.

In addition, a huge financial and non-financial loss occurs when a name error is found and the name is changed after the name of a person, a company, a brand, a product, a service is determined and published, or is officially used through legal procedures. According to the embodiments of the present disclosure, it has the effect of minimizing the name error from the point of view of internationalization at the step of initial naming.

In addition, in China and Japan, the proportion and influence of simplified Chinese characters replacing the original complex Chinese characters are increasing, and as a result, the number of Chinese characters with the same notation tends to decrease in countries with Chinese character culture such as Korea. China, and Japan. In addition, many countries in the Chinese character culture have intendedly changed the original Chinese character language due to the unique culture and habits of each country. Therefore, it is highly likely that the various usage aspects of Chinese characters in Chinese character cultured countries will be more complicated in the future. According to the embodiments of the present disclosure, According to embodiments of the present disclosure, a naming process may be supported based on a database including Chinese character's usage information of a plurality of Chinese character cultured countries. In addition, by updating the changes in usage of Chinese characters in the database, names can be systematically evaluated based on information on the use of Chinese characters in other countries.

DETAILED DESCRIPTION OF THE EMBODIMENTS

Figure 1:
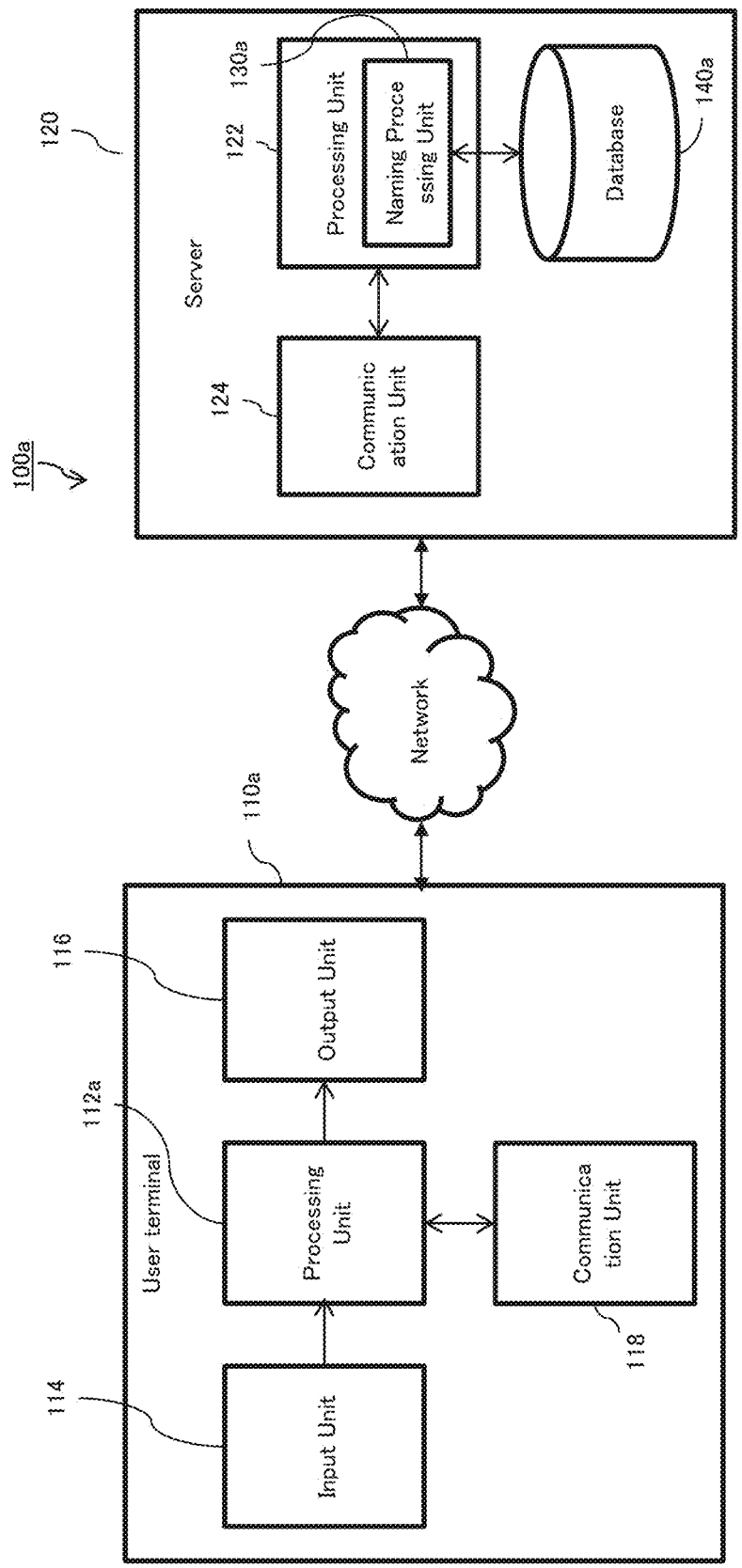
FIG. 1 is a diagram illustrating a structure of a naming system according to an embodiment.

The present specification clarifies the scope of the claims of the present disclosure, and explains the principles of the embodiments of the present disclosure, and discloses the embodiments, so that a person of ordinary skill in the art to which the embodiments of the present disclosure belong can practice the embodiments of the present disclosure. The disclosed embodiments may be implemented in various forms.

Like reference numerals refer to like components throughout the specification. This specification does not describe all elements of the embodiments, and general content in the art to which the embodiments of the present disclosure belong or content overlapping between the embodiments is omitted. As used in the specification, the term 'part' or 'portion' may be implemented in software or hardware. And, it is also possible that a plurality of 'parts' may be implemented as a unit, element, or one part may include a plurality of elements, according to exemplary embodiments. Embodiments of the present disclosure will be described below with reference to the accompanying drawings.

In this specification, the term 'name' includes a name of a variety of objects, such as a person, enterprise, product, service, or brand.

FIG. 1 is a diagram illustrating a structure of a naming system according to an embodiment. The naming system 100a includes various forms of systems that provide name's evaluation information used for naming. The naming system 100a may be implemented as a single device, or may be implemented as a combination of multiple devices in communication with each other. The claim scope of the present application is not limited by the entity or connection form included in the naming system 100a, but encompasses all forms of systems, devices, methods, and computer programs encompassed by the components or operations of the claims.

The naming system 100a according to one embodiment includes a user terminal 110a and a server 120. The user terminal 110a and the server 120 may be connected via a network to exchange control signals and data.

The user terminal 110a is an electronic device having a user interface that receives input from a user and provides information to the user. The user terminal 110a may execute a computer program or an application that performs each operation or step of the naming system control method. The user terminal 110a may be implemented in the form of various types of electronic devices, for example, a communication terminal, a smart phone, a wearable device, a tablet PC, a desktop PC, or a laptop PC.

The user terminal 110a may include a processing unit 112a, an input unit 114, an output unit 116, and a communication unit 118.

The processing unit 112a controls the overall operation of the user terminal 110a. The processing unit 112a may be implemented with one or more processors. The processing unit 112a may execute instructions or commands stored in a memory (not shown) of the user terminal 110a to perform a predetermined operation.

The input unit 114 receives user input. The input unit includes, for example, an input interface device such as a touch screen, a keyboard, a mouse, a touchpad, a microphone, or the like.

The output unit 116 outputs various information. The output unit 116 includes, for example, a display, a touchscreen, and an indicator light (e.g., LED) for outputting visual information. Further, the output unit 116 may include, for example, a speaker, a printer, a vibration device, and the like.

According to one embodiment, the input unit 114 and the output unit 116 may be integrated into one component and implemented, for example, as a touchscreen.

The communication unit 118 performs communication with the server 120 or an external device. The communication unit 118 may include at least one communication module (not shown) that communicates in accordance with a predetermined wireless communication specification. The communication unit 118 can perform short-range communication, and can use, for example, Bluetooth, Bluetooth Low Energy (BLE), Near Field Communication (NFC), WLAN (Wi-Fi). Zigbee, infrared data association (IrDA)

communication, Wi-Fi Direct (WFD), ultra-wideband (UWB), Ant+ communication, and the like. As another example, the communication unit 118 may use mobile communication and may transmit and receive wireless signals with at least one of a base station, an external terminal, and a server on a mobile communication network. The communication unit 118 may include, for example, a communication module that supports one or more of communication specifications such as High Speed Downlink Packet Access (HSDPA), High Speed Uplink Packet Access (HSUPA), Long-Term Evolution (LTE), Evolution-Data Optimized or Evolution-Data Only (EV-DO), EV-DO Rivision A, EV-DO Rivision B, Wibro. Wireless Broadband, Flash-OFDM, IEEE802.20, LTE Advanced, Wibro Evolution, etc.

The server 120 receives data and control signals from the user terminal 110a and transmits predetermined data and control signals to the user terminal 110a while communicating with the user terminal 110a via a network. The server 120 may be implemented in various forms of electronic devices and may be implemented in the form of a cloud server. The server 120 may be implemented in a distributed form on a plurality of devices and may communicate with the user terminal 110a via one or more relay devices. In addition, each of the plurality of devices constituting the server 120 may be operated by the same entity or may be operated by different entities.

The server 120 may generate and transmit name's evaluation information to the user terminal 110a based on the first language name information received from the user terminal 110a.

According to one embodiment, the server 120 may include a processing unit 122, a communication unit 124, and a database 140a.

The processing unit 122 controls the operation of the entire server 120. The processing unit 122 may be implemented with one or more processors. The processing unit 120 may execute instructions or commands stored in a memory (not shown) of the server 120 to perform a predetermined operation.

The processing unit 122 may include a naming processing unit 130a that performs the naming processing operation according to the embodiments of the present disclosure. The naming processing unit 130a may be implemented as a separate hardware processor or in the form of a software module operating on the processing unit 122. The naming processing unit 130a may generate the name's evaluation information based on one or more of various other languages with the evaluation basic information (pronunciation voice, character notation, etc.) of the name input from the user terminal 110a via the communication unit 124. In many cases, names are made on the premise that they are used in a particular language culture, but brand names or company names are often named without the premise of a particular language culture. The names to be evaluated are often named on the premise that they are used in a particular language culture, but the brand name of the product or the company name is often named without the premise of a particular language culture. Hereinafter, in the present invention, the expression "evaluation the first language name, based on the target language" refers to the evaluation of the to-be-evaluated name based on one or more of several languages, and the expressions, "first language" and "target language" do not refer to one specific language. Further, the processing unit 122 may output the name's evaluation information to the user terminal 110a via the communication unit 124. Further, the naming processing unit 130a may generate the Chinese character's usage information in the second country based on the first country Chinese character name information input from the user terminal 110a via the communication unit 124, and output the Chinese character's usage information for the second country to the user terminal 110a via the communication unit 124.

According to one embodiment, the processing unit 122 may transmit to the user terminal 110a an installation file of a computer program or application that performs each operation or step of the naming system control method according to a request of the user terminal 110a. The user terminal 110a may receive an installation file of a computer program or application, install the computer program or application, and operate according to the program.

According to another embodiment, the naming system 100a may provide functionality related to naming processing in the form of a web service or a cloud service. The processing unit 122 of the server 120 may provide processing and a graphical user interface (GUI) for providing a web service or a cloud service. The user terminal 110a may connect to a web service or a cloud service provided by the server 120, receive a user input via the GUI view and forward it to the server 120, and receive a result of the naming process via the GUI view.

The communication unit 124 communicates with the user terminal 110a via a network. The communication unit 124 may communicate with multiple user terminals 110a or external devices.

The database 140a may include at least one storage medium or storage device. The database 140a may be implemented in a cloud storage form. The database 140a stores language information of various language cultures.

Language refers to a social system that has been spoken for communication, and letters refer to a visual symbol system used to write languages. Types of languages include Korean, Chinese, Japanese, and English, and types of letters include Hangul, alphabet, Chinese characters, and Ghana.

Language information in various language and culture areas includes information such as letters, pronunciation, words, or meaning of letters used for notation in each of a plurality of languages, and country information in which the language is mainly used. One or more languages may correspond to each country, and a plurality of notation characters may correspond to each language. For example, letters indicating Korean names may be Hangul, Chinese characters, alphabets, etc., and letters indicating Japanese names may be Chinese characters, Hiragana, Katakana, alphabets, etc. In addition, for example, a Korean name is sometimes used as Katakana in Japan. As such, a specific language name may also be written as a character mainly used in the language area or a character used in another language area. Even if the same or similar characters (alphabets, Chinese characters, and the like) are used in a plurality of languages, pronunciation information, meaning information, and the like for a specific character or a combination of characters in each language may be defined and stored differently. For example, although Chinese characters may be used for writing Korean, Japanese, and Chinese languages, Chinese character's usage information such as the shape, the pronunciation, and the meaning of a specific Chinese character or a combination of specific Chinese characters may be defined differently for each language.

In addition, while English may be used in a number of English-speaking countries, such as the United States, the United Kingdom, and the like, English pronunciation information in each country and English semantic information associated or relevant to a particular voice may be defined differently.

In addition, the database 140*a* may store nameology information, country-by-country statute information, country-by-country computer character input/output tool information, or the like. The database 140*a* may be updated by the administrator of the naming system 100*a*, or may be updated by the user terminal 110*a*.

Figure 2:
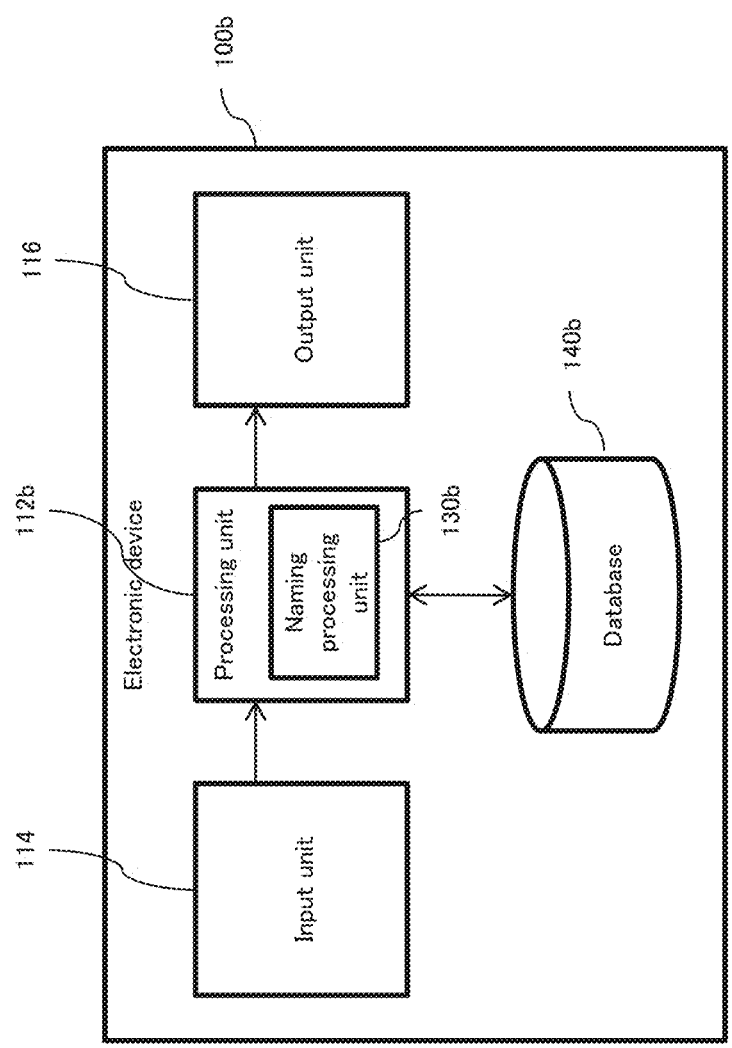
FIG. 2 is a diagram illustrating a structure of a naming system according to another embodiment.

FIG. 2 is a diagram illustrating a structure of a naming system according to another embodiment of the present disclosure.

According to another embodiment of the present disclosure, the naming system 100*b* may be implemented in the form of a single device. The electronic device 100*b* corresponding to the naming system 100*b* may include an input unit 114, a processing unit 112*b*, an output unit 116, and a database 140*b*. The processing unit 112*b* may include a naming processing unit 130*b*. The electronic device 100*b* may be implemented in the form of, for example, a desktop PC, a tablet PC, a laptop PC, a kiosk, a communication terminal, or a smartphone.

Input unit 114 and output unit 116 of FIG. 2 may correspond to input unit 114 and output unit 116 of FIG. 1, respectively. The database 140*b* of FIG. 2 may correspond to the database 140*a* of the server 120 of FIG. 1.

The processing unit 112*b* controls the overall operation of the electronic device 100*b*. The processing unit 112*b* may be implemented with one or more processors. The processing unit 112*b* may execute instructions or commands stored in a memory (not shown) of the electronic device 100*b* to perform a predetermined operation.

The naming processing unit 130*b* may be implemented as a separate hardware processor or in the form of a software module operating on the processing unit 112*b*. The name processing unit 130*b* may determine the name evaluation's basic information based on the to-be-evaluated name information (first language name information) input via the input unit 114, and evaluate it based on the target language to generate the name's evaluation information. The first language name information includes at least one or more of the following: i) pronunciation information of the first language name; ii) letter notation information of the first language name (e.g., Hangul notation, Chinese character notation, alphabet notation, Katakana notation of Korean name); iii) pronunciation information of a second language name corresponding to a pronunciation or a lettering of the first language name; iv) character notation information of a second language name corresponding to the first language name pronunciation or character notation; v) desired information for the first language name.

The first language name information input by the user may be the name evaluation's basic information as it is, and it is also possible to generate one or more of the above i) to iv) information not included in the first language name information based on the first language name information and add it to the name evaluation's basic information. Based on the first language name information, when additionally name evaluation's basic information is generated, the user may select information recommended by the system based on the first language name information, or the system may automatically generate the information. Further, the processing unit 112*b* may output the name's evaluation information via the output unit 116. For example, the naming processing unit 130*b* may recommend Korean-style Chinese characters corresponding to the first language name information (Hangul notation of the Korean name) input via the input unit 114 and, if the user selects one of them and the Korean-style Chinese character name is determined, the Hangul notation and the Korean-style Chinese character name of the Korean name become the name evaluation's basic information, and perform a name evaluation on the name evaluation's basic information based on the language use information (such as Chinese character's usage information) in the Japanese language which is the target language, and output the result through the output unit 116. The second language name corresponding to the pronunciation or character notation of the first language name in the present invention means a second language name having an association with the first language name. For example, it may be an example such as a first language name (Korean name with pronunciation/ (jian)/) and a second language name (Japanese name with pronunciation/(tomoyasu)/) using the same Chinese character notation. As another example, the alphabetical notation (Eugene) of the second language name (English name) with the same or similar pronunciation as the Korean alphabet's Hangul notation (유진) of the first language name (Korean name). The character notations of the first language name and the second language name may be identical or similar to each other, and the pronunciations for character notations of the first language name and the second language name may be identical or similar to each other. In the present invention, the user may further input a second language name associated with the first language name, and the system may allow the user to select after presenting a plurality of second language names in view of the relevance to the first language name. Further, the first language name information could be desired information on name. For example, the desired information is input as 'the first language name sharing the same character notation as the second language name'. Then, the system suggests the first language name candidate and the second language name candidate meeting the desire, and the name evaluation's basic information is determined by the user's selection. The present invention can easily assist in the naming of a plurality of names correlated therebetween that have a sense of discomfort in different language cultures (such as the naming of multiple language names of a child by international marriage).

Figure 3:
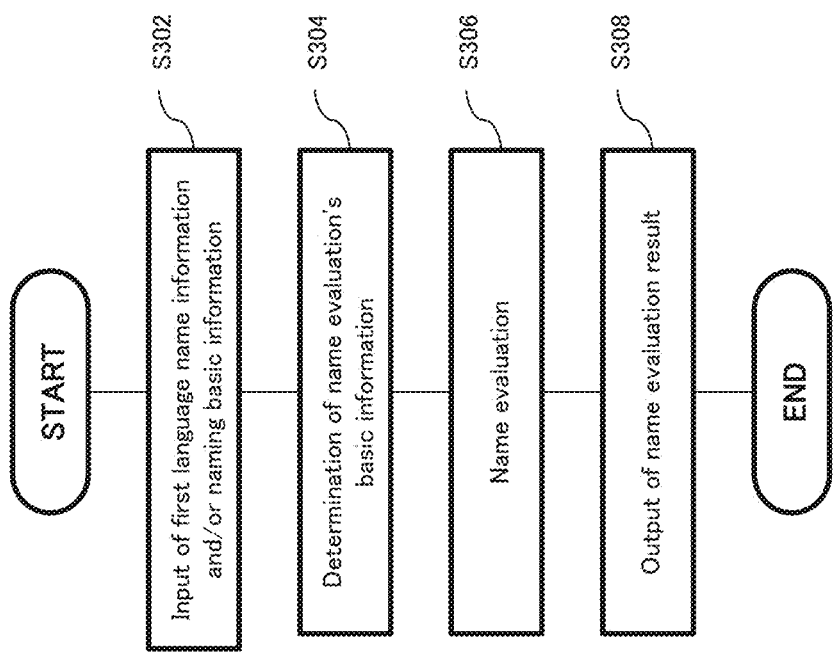
FIG. 3 is a flow chart illustrating a method for controlling a naming system according to one embodiment.
Figure 4:
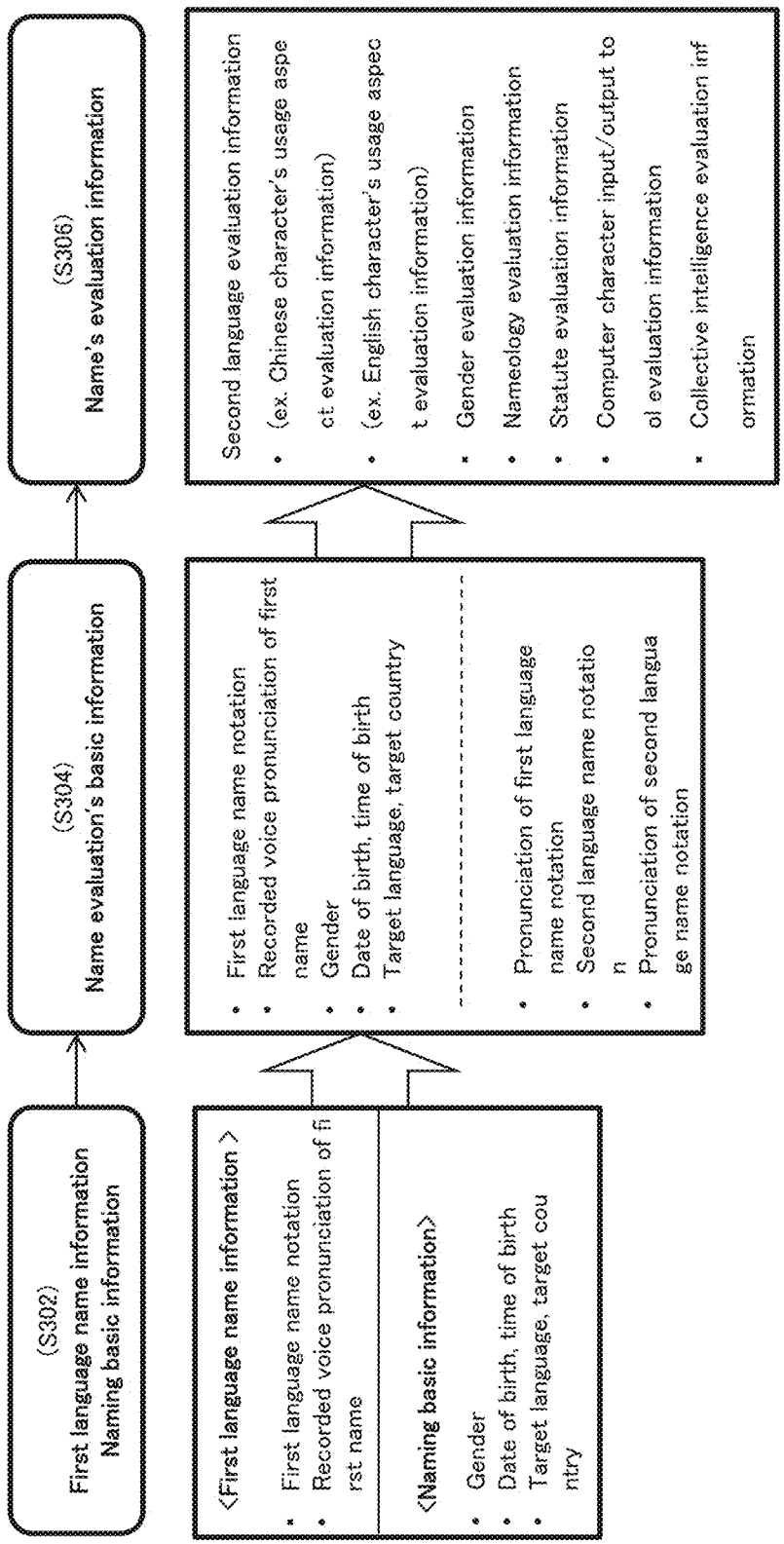
FIG. 4 is a diagram for explaining a process of generating name's evaluation information based on the target language based on first language name information according to an embodiment.

FIG. 3 is a flowchart illustrating a method for controlling a naming system according to an embodiment of the present disclosure. FIG. 4 is a diagram for explaining a process of generating name's evaluation information based on a target language based on first language name information according to an embodiment of the present disclosure. A naming system control method will be described with reference to FIGS. 3 and 4.

Each of the steps of the naming system control method of the present disclosure can be performed by various forms of electronic devices having an input unit, a processor, and an output unit. The present specification will focus on an embodiment in which the naming systems 100*a* and 100*b* according to the embodiments of the present disclosure perform the naming system control method. Thus, the embodiments described for the naming systems 100*a*, 100*b* are applicable to embodiments for the naming system control method, and vice versa. The naming system control method according to the disclosed embodiments is performed by the naming systems 100*a*, 100*b* disclosed herein, and the embodiments thereof are not limited, and may be performed by various forms of electronic devices. The naming systems 100*a*, 100*b* according to various embodiments are collectively referred to herein as the naming system 100. The subject performing each operation of the naming system control method may vary according to the embodiments. According to one embodiment, each operation of the naming system control method may be performed by the user terminal 110a, the server 120. According to another embodiment, each operation of the naming system control method may be performed by the electronic device 100b.

The naming system 100 first receives first language name information and naming basic information (S302). The first language name information is essentially input information, and the naming basic information is selectively input information.

The first language name information is character notation or pronunciation information. The character notation may be input into a computer character input tool. The computer character input tool may include language input tools defined in various computer operating systems, and may include character input tools defined in operating systems such as, for example, Microsoft Windows, Mac OS X, Linux, etc. The pronunciation information may be input into a voice input tool, such as a microphone, or may be input into symbol information, such as a pronunciation symbol, which is widely used internationally.

The naming basic information is additional information considered in the naming. The naming basic information may include, for example, at least one or a combination of gender, date of birth, time of birth, target language culture, target country. The type and combination of the naming basic information may be variously determined according to the embodiment. In addition, the name basic information is necessarily input, but some of the contents may be optional input information. For example, the target language may be set as mandatory input information, and the gender, date of birth, time of birth, and target country may be set as optional input information. It is also possible that the selection of the target country and the target language is set to multiple countries/multiple languages.

Alternatively, it is also possible to input only the first language name information without inputting the name basic information. In this case, the target country and the target language may be selected or individually set by the user at the time of the initial sign-in. In addition, the system may automatically set the target country and the target language to be considered preferentially even if the user does not input the target country and the target language.

Next, the naming system 100 determines the name evaluation's basic information based on the first language name information and the naming basic information (S304). The name evaluation's basic information may be automatically generated in the system and selected by the user from among the candidates generated in the system. The term "determination of name evaluation's basic information" in the present invention includes all such cases.

The pronunciation information is voice information of symbol information indicated by using a common pronunciation rule such as International Phonetic Alphabet (IPA). The voice information may be recorded by the user directly on the system or voice information may be generated using TTS (Text to Speech).

The character notation of the first language name is the name of the first language written in various language characters. It may be denoted by a character that is mainly used in the first language culture, or may be denoted by a character that is mainly used in other language cultures. For example, the letter notation of the first language name, which is a Korean language, may be a letter in Korean-style Chinese character or Hangul or alphabet, which is used in the Korean language culture, or may be a notation using the alphabet letters used in other language cultures (e.g., the Katakana notation of the Korean name). The second language name is a name that is relevant to the first language name as described above, and the character notation of the second language name may also be written in various characters. The character notation of the name may be input by the user, and the naming system 100 may present the character notation candidates corresponding to the pronunciation of the name and the user may select.

The character notation of the first language name or the character notation of the second language name may be a Chinese character name notation. Even in countries that use Chinese characters, the Chinese character's usage patterns vary in each country. Thus, the naming system 100 can receive a Chinese character name by a user based on the Chinese characters being used in the first language culture area or a specific country, or the user can select one of the Chinese characters recommended by the system. Chinese characters are used in China, Japan, Taiwan, Hong Kong, Macau, Singapore. Malaysia, and Vietnam, etc. The Chinese characters used in these countries vary from country to country. For example, the original Chinese characters are used in Korea, while the simplified Chinese characters are used in China and Japan. In addition, each country has different standards for Chinese characters in common-use and person's name-use. The naming system 100 stores such country-to-language Chinese character's usage aspects in databases 140a, 140b and provides name evaluations about the Chinese character name notation based on Chinese character's usage aspects and usage habits in other countries.

According to one embodiment, if the first language Chinese character notation of the first language name is input as the first language name information or generated as the name evaluation's basic information, the naming system 100 may generate a second language Chinese character notation used in a second language culture corresponding to the first language Chinese character notation.

According to another embodiment, the naming system 100 may generate the second language Chinese character name notation based on the pronunciation information input as the first language name information or the pronunciation information generated as the name evaluation's basic information. For example, Chinese character name candidates corresponding to English pronunciation/(cokacola)/are presented by the system so that the user can easily select the Chinese character name.

In the case that both the first language culture and the second language culture are using Chinese characters for a name, the naming system 100 may find a corresponding Chinese character in the Chinese character of the target country, based on the first language name Chinese character notation, and define the second language name Chinese character notation as the corresponding Chinese character. If there is no Chinese character corresponding to the first language Chinese character notation among the Chinese characters being used in the target country, the naming system 100 may generate and output information that there is no corresponding Chinese character. In addition, even if there is a corresponding Chinese character, the system may generate information on differences about shapes or the numbers of strokes in Chinese characters.

The type of name evaluation's basic information generated in the naming system 100 or input by the user may vary according to embodiments. According to one embodiment, if the first language is Korean and the target language is Japanese, when the user inputs a Hangul notation (first language name information) of the Korean name, the system generates the same Hangul notation as the name evaluation's basic information. In addition, i) Korean-style Chinese character notation corresponding to the Hangul name, ii) pronunciation information (pronunciation symbol or voice) of the Hangul name, iii) alphabet notation corresponding to the Hangul name, iii) Japanese-style Chinese character notation corresponding to Korean-style Chinese character notation, iv) Japanese pronunciation information (pronunciation symbol or voice) for Japanese-style Chinese character notation, etc. may be added as the name evaluation's basic information. The added name evaluation's basic information is automatically generated in the system, or the user selects candidates provided in the system. The above i) to iv) can also be input as the first language name information by the user at first. Then, the name evaluation's basic information related to the Korean name (first language name) is evaluated based on the Japanese language, which is the target language, and the Japanese name (second language name) is evaluated based on the Korean language related to the initial name information. Further, the second language name may be the other language name that is not related to the target language.

As another embodiment, the case where the first language is Korean and the target language is English is described. When a Hangul name is input as the first language name information, the alphabetical notation information of the Korean name and the pronunciation voice information of the Korean name are generated based on it. And, all of the Hangul name, the alphabetical notation, and the voice information become the name evaluation's basic information.

If the name evaluation's basic information is determined (S304), then the naming system 100 generates the name's evaluation information based on the name evaluation's basic information (S306). If the name basic information is already input, this information is also considered for evaluation.

The name's evaluation information is information evaluated in various aspects, such as a meaning aspect, a statutory aspect, a computer character input/output tool aspect, and ease of pronunciation, with respect to the name evaluation's basic information of the first language name information based on the target language. The naming system 100 generates name's evaluation information for the first language name information based on the target language. In the case of evaluating based on languages using Chinese characters, Chinese character's usage aspect evaluation information in the target language may be generated for the first language Chinese character notation. This setting may depend on the setting of the naming system 100 or on the setting of the user via the user terminal. The name's evaluation information may include at least one or a combination of language-by-language Chinese character's usage aspect evaluation information, target language evaluation information, pronunciation evaluation information, statute evaluation information, computer character input/output tool evaluation information, or collective intelligence evaluation information.

The Chinese character's usage aspect evaluation information indicates information on the meaning recognized by the Chinese character name in the target language or the target country, whether it is a Chinese character used as common-use or in a person's name, or whether there exists a similar or corresponding Chinese character, based on the Chinese character notation of the first language name.

The naming system 100 may generate meaning information recognized by Chinese character name notation based on Chinese characters of a target language or country. Also, it generates information about an image (positive image or negative image) by the recognized meaning. In the case of Chinese characters, one character may have various meanings, and the priority of the meanings recognized by each country may be different. For example, in Korea, the first meaning of "'荷'" is "lotus flower" in Korean-style Chinese character dictionaries, however, the first meaning of the character if "baggage" in Japan-style Chinese character dictionaries. Therefore, in Korea, it is recognized as a good-meaning Chinese character for names and commonly used for naming, but in Japan, there is a problem that it is perceived as a negative meaning. The naming system 100 of the present disclosure has the effect of being able to filter out a case where a Chinese character name used in a good sense in a first country is recognized as a negative sense in a target country.

The naming system 100 determines whether or not the Chinese characters used in the Chinese character name notation are Chinese characters being used in a person's name. In countries where Chinese characters are used, there are different types of standards regarding common-use or person's name-use Chinese characters. In the first language used in a first country, a Chinese character name is recognized as a person's name and its meaning can be easily grasped, but sometimes it is not recognized as a person's name and its meaning cannot be easily grasped in a second country, because of the differences in common-use Chinese characters or person's name-use Chinese characters. Therefore, in the case of a Chinese character name, whether or not the Chinese characters belong to common-use Chinese characters or person's name-use Chinese characters in the target country is a major filtering criterion.

In addition, in the naming system 100, whether a Chinese-language name in a combination of Chinese characters is recognized as a person's name or the name of a product or service in a target country or a target language culture, is the main filtering criterion for name's evaluation information. For example, "秀吉" is a combination of Chinese characters that are recognized as human beings i and Japan, and it is pronounced as "Soo Gil" in Korea and "Hideyoshi" in Japan without a sense of discomfort. In addition, in the case of "'智元'", it is pronounced as "Ji Won" in Korea and "Tomomoto" in Japan, and is easily recognized as a Chinese character referring to human. In addition, in the case of "智安"", it is pronounced as "Tomoyasu" in Japan and "Ji An" in Korea, the Chinese characters are being used in a person's name and it can be easily recognized and memorized by the general public in each country. According to the present invention, it has the effect of selecting a Chinese character name that is recognized as a person's name in various Chinese character cultured countries, is not negatively recognized, and can be easily pronounced in a language used in that country.

In addition, the naming system 100 may generate information on whether there is a corresponding Chinese character in the second language when the Chinese character notation of the first language name is included in the name evaluation's basic information. Since the types of Chinese characters used by different countries are different in the Chinese character culture, there may be no Chinese characters in the second country corresponding to the Chinese characters used in the first country. The naming system 100 may generate and output, from the name Chinese character notation included in the name evaluation's basic information input or selected, information that there is no corresponding Chinese character if there is no Chinese character corresponding to the first Chinese character name notation in the second Chinese character. According to one embodiment, if the shape of the second-country Chinese character corresponding to the first-country Chinese character name notation is different from the first-country Chinese character, it is possible to generate information on the presence or absence of to the corresponding Chinese character in consideration of the similarity of the Chinese character shape. Even in the case of Chinese characters commonly used in different countries, if the shapes of Chinese characters used in each country are different, it is possible to increase the filtering level of Chinese characters and filter them in consideration of the similarity of Chinese characters in each country. That is, the naming system 100 can generate and output information as to whether the shapes of the Chinese characters used in the first and second Chinese characters names are different. For example, the Chinese character with the meaning of 'national state' is used in a different shape for each country. Thus, the naming system 100 can generate and output information that a corresponding Chinese character exists for the first and second Chinese character names in which the 'national state' letter is included, but different shapes of Chinese characters are used. As another example, in the case of the Chinese character having a meaning of 'flat' is used differently in terms of shapes in Korea/China and Japan. However, they differ only in the direction of dots, so the similarity is very high. Thus, if Korea or China is defined as the first country, and Japan is defined as the target country, the naming system 100 can provide information that the form of the first and second Chinese character names is different, but the similarity is high. The degree of similarity between Chinese characters can be determined by various methods, such as determination based on similarity of components consisting of Chinese characters and shapes, etc. For example, the naming system 100 may determine that the shape similarity of Chinese characters is high in a case where the shape units of each Chinese character are 90% or more similar to the first and second Chinese character names. In addition, the naming system 100 may use an image similarity determination algorithm to determine the similarity between Chinese characters.

According to one embodiment, the naming system 100 may determine whether it is a Chinese character used in major Chinese character cultured countries and output it as name's evaluation information. Considering the economic activities of the Chinese character cultured countries, China and Japan are very important. Thus, when generating the name's evaluation information for the Chinese character notation name, the naming system 100 can jointly determine whether or not it is a Chinese character used in a major Chinese character cultured country such as China and Japan in addition to the target country, and generate the name's evaluation information.

The naming system 100 may generate English usage aspect evaluation information based on to alphabetical notation of a name included in the name evaluation's basic information. The English usage aspect evaluation information may include pronunciation difficulty evaluation information, semantic evaluation information, or country-by-country pronunciation uniformity evaluation information, or the like.

The naming system 100 may generate pronunciation difficulty evaluation information for alphabetical name notation. According to one embodiment, the pronunciation difficulty may be evaluated based on a combination of phonemes or syllables included in the alphabetical name notation. For example, the naming system 100 may define a combination of phonemes or syllables having a high pronunciation difficulty in English in advance, and determine that the pronunciation difficulty is high if a combination of the predefined phonemes or syllables is detected in the English name notation. The pronunciations of some Hangul consonants are very difficult to pronounce in English culture. And even if a foreigner pronounces the Hangul consonants, people in English culture cannot hear and understand it accurately. According to the embodiments of the present disclosure, by filtering phonemes, syllables, or the combinations thereof with high pronunciation difficulty in English, there is an effect of assisting in naming easy-to-pronounce names in English-language culture countries.

The naming system 100 may generate semantic evaluation information based on English for a to-be-evaluated name. The naming system 100 may generate meaning evaluation information based on English, for the notation and pronunciation information of the to-be-evaluated name. If the notation of the to-be-evaluated name is alphabetical, the naming system 100 may define the meaning searched in the English dictionary by the alphabetical name notation or some spelling combination included in the alphabetical name notation, and perform a meaning evaluation on the defined meaning. In addition, the naming system 100 may define, based on the pronunciation information of the to-be-evaluated name, at least one English word having a high degree of similarity to the full or a portion of pronunciation of the name, and perform a meaning evaluation on the meaning of the English word. The naming system 100 may store evaluation information for each meaning in a database, and perform the semantic evaluation using the stored evaluation information. For example, if the to-be-evaluated name includes a pronunciation similar to /(sʌk)/, there is a possibility that it may be negatively recognized as "suck" in English. According to embodiments of the present disclosure, there is an effect of being able to filter a name recognized in a negative sense in the English language in the naming process.

The naming system 100 may generate country-by-country pronunciation uniformity evaluation information for alphabetical name notation. The naming system 100 may store information on English pronunciation rules of a plurality of countries in a database, define country-by-country pronunciation for alphabetical name notation based on the English pronunciation rules of the plurality of countries, and determine a similarity between country-by-country pronunciations. In the case of the alphabetical name notation "Jung", pronunciation in Korean, Spanish, English, etc. is different from each other, and the naming system 100 generates and outputs name's evaluation information indicating that it is likely to be pronounced differently in different countries. In addition, since the pronunciations of 'z' and 'h' are different in the Spanish-speaking and English-speaking cultures, the naming system 100 can generate the name's evaluation information regarding country-by-country pronunciation difference.

The naming system 100 may generate, for the first language name information, name's evaluation information based on the target language (S306). The name's evaluation information may include semantic evaluation information recognized by the first language name information based on the database for the target language, pronunciation evaluation information, gender-based evaluation information, name suitability information, and the like. The naming system 100 may generate, for the first language name information, semantic evaluation information based on the target language. The naming system 100 can generate the semantic evaluation information in consideration of both the meaning searched in the dictionary of the target language by the character notation itself of the first language name and the meaning of the word of the target language corresponding to the pronunciation of the first language name and the pronunciation with a high degree of similarity. In the case of the name/brand/product name "Oh Na-ra" in Korean, the word of this pronunciation means fart in Japanese, which is inappropriate for the name. Therefore, if the target country that is the basis of the evaluation is Japan or the target language is Japanese, the naming system 100 can generate and output the meaning evaluation information that the target language notation corresponding to the first language name 'Oh Na-ra' has a negative meaning as the name's evaluation information. In addition, although "Iseki" is sometimes used in Japanese as a trade name or brand, since it is a pronunciation recognized as a slang in Korean, in the case where the evaluation target is Korean, the naming system 100 can generate and output, on a target language (Korean) basis, meaning evaluation information having a negative meaning for alphabetic notation of the first language (Japanese) name "Iseki" as name's evaluation information. The evaluation target in the present invention may be set on a language basis, or may be set on a national basis. Further, the evaluation target may be set to a plurality. In addition, the names "Inho" and "Inha" are often used in Korean names, and in Portuguese, the suffixes meaning "small" are inho and inha, so the impression of the original name and the impression recognized in countries using Portuguese are likely to change.

In addition, in the case where the pronunciation of "Eun" is included in the Korean language notation of the Korean name, the pronunciation sound may be reminiscent of poop in Japanese.

In addition, the sound of "ㅣ" in Korean is sometimes denoted by the alphabet "k" in English and is recognized close to "k" by the Japanese. Therefore, with respect to the voice pronunciation of the Korean name "Go-a-ra", there are cases where the voice pronunciation is the same as or similar to the voice pronunciation of Koala in Japanese.

The pronunciation of Korean names such as "Shin-hye," "Shin-ae," and "Shi-nae" is perceived in Japanese as meaning "die".

In Japan, the Korean name "da-jeong" may be perceived as a cute expression in a spoken language. In addition, in the case of a Korean name that ends with "Ho," it is sometimes called "hoh" in the English-American world, and such a pronunciation voice is sometimes recognized as "whore". The Korean name "Minha" is pronounced as "Mina," and when the Japanese honorifics word "san" is used after the name, it is sometimes perceived as the word which means everyone in Japan. In addition, the pronunciation of the English name "Gary" or "Garry" is similar to the pronunciation of the Japanese word which means diarrhea and is also negatively recognized.

The naming system 100 may generate pronunciation evaluation information based on the target language for the first language name information. The name pronunciation information, which is included as the name evaluation's basic information, is generated by the naming system 100 (generation of pronunciation information corresponding to various character notations of the first language name) or input by the user in the form of a character, a voice, a symbol, or the like. Then, based on the name evaluation's basic information, the pronunciation difficulty may be evaluated for the pronunciation information of the first language name based on the target language. According to one embodiment, the pronunciation difficulty may be evaluated based on a combination of phonemes or syllables included in the various characters of the first language name. For example, the naming system 100 may predefine a combination of phonemes or syllables having a high pronunciation difficulty level in the target language, and to determine that the pronunciation difficulty level is high if the combination of the predefined phonemes or syllables is detected in the target language name. In Japanese, there is no pronunciation that ends with the alphabet "ng" pronunciation, corresponding to Hangul "ㅇ", so it is difficult to make this pronunciation from the Japanese perspective. The naming system 100 may generate pronunciation evaluation information that has a high level of pronunciation difficulty in terms of the Japanese language, which is the target language, in a case where the first language is Korean, and the characters of the 'ㅇ' are included in the first language name Hangul notation.

In addition, in the case of the Korean language "횡", "혜", "훠", "역" and "슝," it is often difficult for foreigners to pronounce, and such pronunciation difficulty evaluation information may be generated.

In addition, the naming system 100 can utilize a voice recognition IT technology known for voice information of name pronunciation, which is the name evaluation's basic information, to extract a target language word of similar voice and utilize it for name evaluation.

According to one embodiment, the naming system 100 may evaluate pronunciation, meaning, ease of use, recognition, and the like in a state of combining a first language name and a title, postposition, and the like that are often combined with a name in the first language or other languages. There are words that are mainly used to refer to names in many languages. For example, in the case of the name "Hong Gil-dong" in Korean, words such as "Ah," "Ih-ga," "Ih-nun," "Ssi," "Nim (corresponding to 'Mr')," and the like are used in combination. However, in some cases, when it is pronounced in combination with such words and a name, it turns negatively in terms of pronunciation, meaning, ease of use, and recognition, even it is not in the name alone. In the case of the Korean name "Jian", when it called with "Ih", the pronunciation is pronounced as "Jianih", and if it is pronounced quickly, it is highly likely to be called "Jonny". As such, when called "Jonny", it is likely to be perceived in Korean as meaning of "are you sleeping." In addition, in the case of the Korean name "Jiwon", if the research is combined with "Jiwon," it may be pronounced as "Jiwony" in the same way, which may be perceived as "limping" in Korean. In addition, there are cases where a name is called with "san", "koon", "jjang", "sama" in Japan. If the last letter of the Korean name is "woon" and when it is called with "jang" in Japanese style, such pronunciation is likely perceived as a slang that lowers the driver in Korean. In addition to the above examples, it is applied for the words being commonly attached with names such as the titles of positions, the titles of family to members such as "sister" and "brother", and "inho" or "inha" in Portuguese. The naming system 100 may store information on frequently used words combined to a person name or a company/service name in a database. And, it performs semantic evaluation, pronunciation evaluation, ease of use evaluation, recognition evaluation, etc. on a first language or target language basis, based on pronunciation in a state in which the name and the combined word are combined. According to the present embodiment, there is an effect of preventing a case where a name is recognized as a negative meaning in use on a target language basis, or pronunciation is very difficult, or the like.

According to one embodiment, the naming system 100 determines the similarity between the pronunciation of the second language and the pronunciation of the first language name, and it generates evaluation information for the second language name based on the similarity of the pronunciation information. In China, the evaluation information may be generated for naming process that reflects both the meaning and sound of Chinese characters tends to be preferred because it is the key to business success to include the sounds of original names and to convey positive images. For example, since 'Coca-Cola (first language name)' is written in Chinese ' 可口可乐 ' (second language name) and has the meaning of 'delicious and pleasant', it can have a similar pronunciation in the first and second language names to effectively promote the sound of the trademark. In addition, the Chinese word has a good meaning, thus it has a positive meaning evaluation value for the second language name. In this way, the naming system 100 according to the embodiments of the present disclosure has the effect of providing name's evaluation information as to whether the second language name corresponding to the first language name has a similar pronunciation of the original language while at the same time giving a positive image.

The naming system 100 may generate gender evaluation information on a plurality of country basis, based on the name evaluation's basic information. The naming system 100 may store country-by-country name gender information in a database, including information about a name recognized as a male and a name recognized as a female by language and country, and generate, based on the information, gender evaluation information for name notation or name pronunciation information based on the target language or country. The naming system 100 defines gender recognition information for a to-be-evaluated name by language-by-language country based on the name evaluation's basic information, and determines whether there is a bilateral match when gender information is input into the name evaluation's basic information. The naming system 100 may output the information itself about the recognized gender, or output information indicating whether the recognized gender and the gender information of the name evaluation's basic information match or do not match. It is also possible to output information about the likelihood of being recognized by a particular gender.

For example, if the first language name is a Korean name and the Hangul notation is " 지원 ", the gender evaluation information may be generated based on the target language/country based on a database already stored for its voice pronunciation/(jiwon)/, the alphabetic notation "Ji Won", the Chinese character notation " 智元 ", the Japanese language pronunciation /(tomomoto)/, the German or Spanish notation corresponding to these notations or pronunciations, and the German/Spanish pronunciation of the notation, etc.

When naming the alphabetical name notation for the first language name (e.g., Korean name), the naming system 100 may generate name suitability information based on the target language. The naming system 100 may generate name suitability information based on semantic evaluation information in a target language for alphabetical name notation, word information not used as a name in the target language, or the like. The naming system 100 may determine that the naming is not appropriate for the name if the semantics evaluation information for the naming is less than a predetermined reference value. In addition, the naming system 100 may include negative word information not used as a name in the target language such as devils, fools, etc. And, it can determine that the alphabetical name notation is not appropriate for the name if the alphabetical name notation corresponds to a word not used as a name in the target language.

The naming system 100 may generate, for the first language name notation, nameology evaluation information. The nameology evaluation information may be generated for first country or the target country, in which the first language is used, or for both countries. There are countries where nameology exists and countries where nomology does not exist, and the naming system 100 can generate nameology evaluation information for the countries where nameology exists. The naming system 100 may contain information about country-by-country nameology theories in a database and generate nameology evaluation information for a first country, a target country, or both countries based on the information about country-by-country nameology theories in the database. The naming system 100 may generate nameology evaluation information for the first country based on the first language name notation and the gender, date of birth, time of birth, Chinese character name, etc. included in the naming basic information. The naming system 100 may generate nameology evaluation information for the target country based on the second language name notation, the second country Chinese name notation, the gender, the date of birth, the time of birth, etc. included in the naming basic information.

The naming system 100 may generate, for the first language name notation or the second language name notation, the statute evaluation information. There are laws and regulations pertaining to the name of a person, the name of a corporation, etc. in each country. For example, Sweden regulates a person's name by name law, and Germany can use the name only if it is approved by the registry office after evaluating the name of a newborn baby by referring to the international name manual. New Zealand restricts people's names by laws. Thus, there are laws related to a name for each country, and the naming system 100 contains the law information of each country in the database, and generates the law evaluation information for the first language name notation or the second language name notation based on the law information stored in the database. The naming system 100 judges, based on the statutory information of the database, whether the first language name notation is in violation of the statutes of the first country, and when it is in violation of the statutes, generates and outputs such information as the statutory evaluation information. In addition, the naming system 100 judges, based on the statutory information of the database, whether the second language name is in violation of the statutes of the second country, and if it is in violation of the statutes, generates and outputs such information as the statutory evaluation information.

The naming system 100 can generate computer character input/output evaluation information for the Chinese character notation of the first language name or the Chinese character notation of the second language name. The computer character input/output tool may include language input/output tools defined in various computer operating systems, and may include character input/output tools defined in operating systems such as, for example, Microsoft Windows, Mac OS X, Linux, etc. Such computer character input/output tools may be defined by language, and a plurality of character input/output tools may be used for the same language. For this, a common computer character input/output tool that is most widely used in each country can be defined. However, since the types of letters supported by the computer character input/output tool for each language are different, in the first country, letters that can be input and output through the computer character input/output tool cannot be input and output through the computer character input/output tool of the target country, so that the input/output of the letters is impossible and the letters are displayed with a predetermined default value and thus cannot be recognized. The naming system 100 may contain information about a country-by-country computer character input/output tool in a database, and determine, for the first language name notation, whether input/output is possible using the target country's computer character input/output tool to generate computer character input/output tool evaluation information. In particular, the naming system 100 may determine, for the Chinese character notation included in the first language name evaluation's basic information, whether or not it is input/output by using the computer character input/output tool of the target country, and generate the computer character input/output tool evaluation information. For example, there are characters that are recognized in the Korean character input/output system but not recognized in the Japanese system. Some Korean-style Chinese characters can be input and output in Korean Windows OS, but cannot be input and output in Japanese Windows OS.

Even if it is the same Chinese character, characters with different shapes are assigned in different codes. For example, in the case of the 圖 and 囲, they have different codes.

However, the problem is the case that the two Chinese characters are similar in shape. In this case, since the preferred form of Chinese characters varies slightly from language to language, the proper rendering is guaranteed only when the font is designated for each language.

However, if it is tried to solve the problem through the font, there is a problem that cannot be distinguished from text documents that are difficult to designate the font. In order to solve this problem, a method of attaching a special character code called an Ideographic Variation Selector (IVS) in Unicode is also introduced, and technical efforts are being made to set specific standards. However, many software and fonts are not related to IVS, and the specifications of IVS are incomplete. As such, if there area plurality of such characters in the target country for the first country Chinese characters and complete rendering is not guaranteed, the naming system 100 may generate computer character input tool evaluation information that letter rendering is difficult in the target country.

In addition, for example, in the case of a unicode Chinese character U+6F88 " 澈," it is widely used in Korean names. However, it is often impossible to respond to software or fonts used in Japan because it is not a Chinese character commonly used in Japan. Therefore, if a text e-mail containing the above Chinese character is sent from Korea to Japan and the original text is included in a reply from Japan, the above Chinese character is often broken and expressed in the signal of "?." Thus, for the first country (or first language) Chinese characters, if they are defined in the computer character input/output tool in the first country (Korea) and Korean language criteria, but in the target country (Japan) or in the target language (Japanese), the Chinese characters are not defined in the computer character input/output tool, the naming system 100 can generate computer character input/output tool evaluation information that the first country (or the first language) Chinese character name is not defined in the target country's is computer character input/output tool.

The naming system 100 can generate collective intelligence evaluation information, for voice's pronunciation and letters of names written in various languages. The naming system 100 may store the country-by-country/language-by-language collective intelligence evaluation information in a database and generate the collective intelligence evaluation information based on the information stored in the database. The country-by-country/language-by-language collective intelligence evaluation information is the information evaluated by users who use the language as his/her mother language. The evaluation items of the collective intelligence evaluation may include, for example, negative recognition, sophistication, recognized gender, etc. The naming system 100 may provide a platform for the collection of collective intelligence evaluation information. For example, the naming system 100 may obtain information about the mother language of each user, provide a GUI that requests the user to provide evaluation information about the to-be-evaluated name based on the mother language, collect collective intelligence evaluation information about the name, and process and store the collected collective intelligence evaluation information in a database.

For example, the user may check the information already stored in the database of the system for the name that he/she wants to check, or check the comment information input by the other user for the input name to filter the name. The other user may select a specific part of a specific character or pronunciation of the to-be-evaluated name and input comment information. The other user's evaluation information for a specific part of the name is then stored in the DB. And, if the specific part is included in another name for evaluation, the previously stored comments are utilized.

Further, the comments input by the other user for the specific name are stored in the database, in which another third-party user can evaluate the reliability. And, the stored comments may be sorted and exposed to other users in order of high reliability.

In order to be evaluated for a particular name, a user may pay directly on the system or purchase and use points on the system. Even if a user does not make a payment or purchase points, he/she may receive the evaluation for free, if he/she generates a name evaluation comment on other user's name evaluation's basic information, or if he/she contributes to increasing the data of the name's evaluation information. That is, if the user contributes to evaluate names, the user may receive the evaluation compensation. The evaluation compensation may be monetary compensation, may be a point for using the naming evaluation system, or may be a link to an online procedure which can receive name evaluation. In addition, the case of contributing to the additional increase of the name's evaluation information data from the target language perspective may cause the evaluation compensation to be further weighted. Evaluation compensation may be provided in the following cases: 1) adding a database of information for name evaluation (adding evaluation information for names such as person's names, product names, service names); 2) secondary evaluation or reliability evaluation of existing information already in the database; 3) inducing other users to subscribe to a system for naming and make comments; 4) if the user subscribed by 3) performs 1) or 2) above; 5) other acts that contribute to the expansion of information databases for name evaluation or the improvement of data reliability.

With such a name evaluation system utilizing collective intelligence, a user who intends to be evaluated for a specific name actively cooperates with the quantitative increase of data for name evaluation, so that the amount of data of the name evaluation system itself gradually increases exponentially rapidly, and the quality of data rapidly increases.

Figure 5:
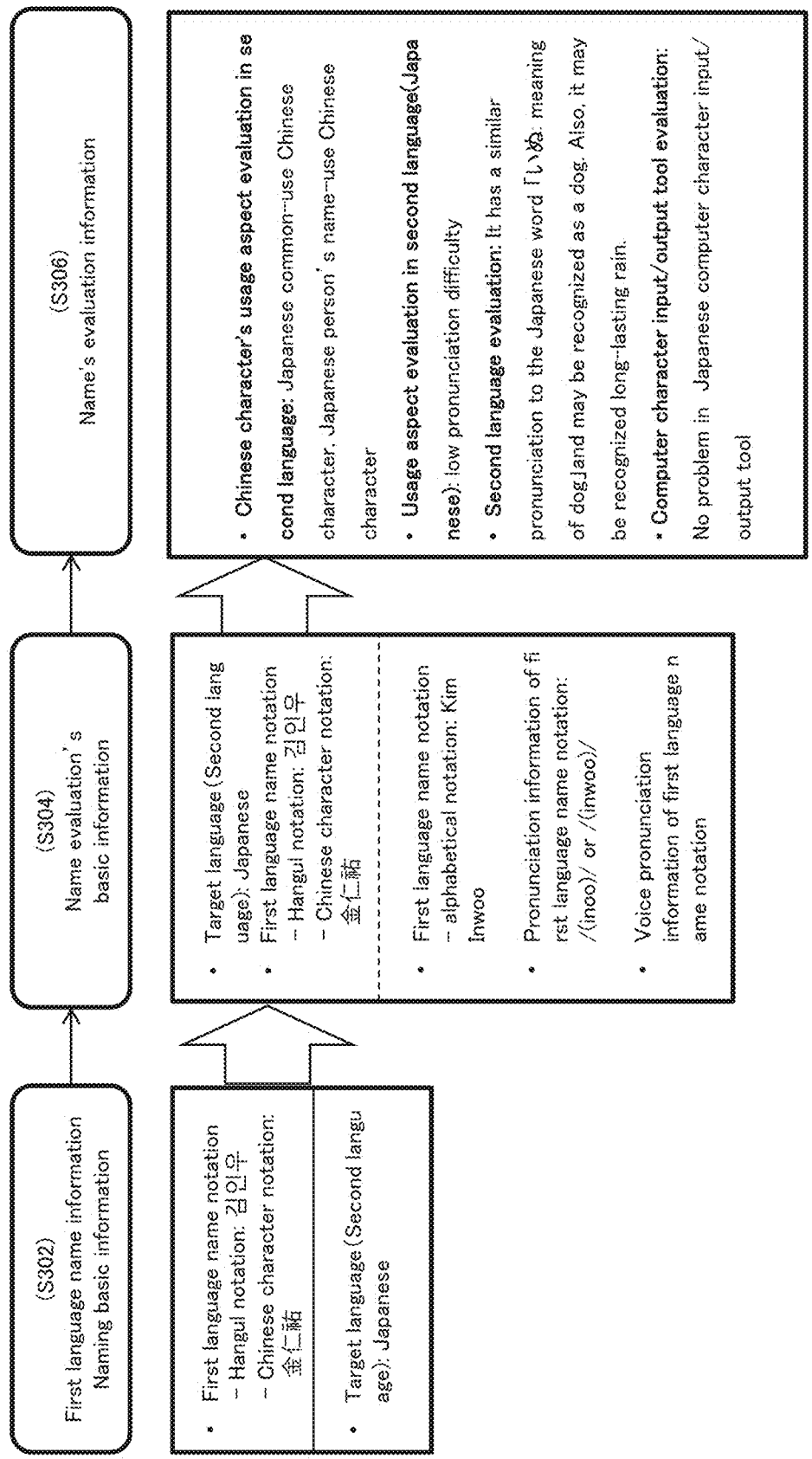
FIG. 5 is a diagram illustrating a process of generating name's evaluation information for first language name information in a naming system according to an embodiment.

FIG. 5 is a diagram illustrating a process of generating name's evaluation information for first language name information in a naming system according to an embodiment.

FIG. 5 describes a case where the first language name is a Korean name and the Korean notation is 'Kim In-woo'. Information that the target language is Japanese has been input as the naming basic information.

The naming system 100 receives such first language name information (first language name notation) and naming basic information (S302), and generates name evaluation's basic information (S304). The first language name information and the naming basic information input by the user are added to the name evaluation's basic information (S304) as it is. In addition, information generated based on the first language name information and the naming basic information is added to the name evaluation's basic information (S304). The information to be added may be selected by the user if the system presents the candidate group based on the first language name information and the naming basic information, may be automatically generated by the system, and may be further input by the user. "Name evaluation's basic information generation" in the present invention means one or more of all such cases.

The naming system 100 may generate pronunciation information of /(inoo)/or/(inwoo)/ based on the pronunciation rule of the first language, Hangul, for the first language name Hangul notation of '김인우(Kim In-woo)'. The first language name notation may consist of first and last names, and the pronunciation information may be generated for the first name or/and the last name according to an embodiment. The pronunciation information may be automatically generated by the system as a pronunciation symbol or voice information, or may be input or recorded by the user.

In addition, the naming system 100 may generate a first language name alphabetical notation based on the pronunciation information or the first language name Hangul notation. For example, "Kim In woo" may be defined as the first language name (Korean name) alphabetical notation for the first language (Korean name) Hangul notation "김인우." The naming system 100 may define an alphabetical notation corresponding to the pronunciation information, or may define an alphabetical notation corresponding to each character of the first language name Hangul notation. For example, the alphabetical notation 'Kim' may be pre-defined for '김', the alphabetical notation 'In' may be pre-defined for '인', and the alphabetical notation 'woo' may be pre-defined for '우', and the information may be stored in the database. The naming system 100 may determine an alphabetical name notation for a first language Hangul or Chinese name notation based on the alphabetical notation information stored in the database. The alphabetical name notation may be automatically generated by the system, selected by the user from among the candidates that the system provides, or input by the user for the first time. The naming system 100 then generates name's evaluation information based on the name evaluation's basic information. The naming system 100 can generate evaluation information that corresponds to the Japanese common-use Chinese character and the Japanese person's name-use Chinese character, with the Chinese character's usage aspect evaluation information for the Chinese character name notation '金仁祐'. In addition, the naming system 100 can generate, as the English usage aspect evaluation information, the evaluation information that the English pronunciation difficulty of 'Kim Inwoo', which is an English name notation, is high. In the case of a Japanese user, information that the pronunciation difficulty is low may be generated. In addition, the naming system 100 can generate evaluation information that the pronunciation sound of the name is similar in pronunciation to the pronunciation 'いぬ' which means a dog in Japanese, and is likely to be recognized as the meaning of a dog. In addition, the naming system 100 can generate, with the computer character input/output tool evaluation information, the evaluation information that the Chinese character notation of the first language name '金仁祐' can be input/output without error in the Japanese computer character input/output tool.

Although an example in which the Chinese character notation of the Korean name is input by the user for the first time has been described in the above-described embodiment, when the Chinese character notation is not input by the user, the naming system 100 suggests candidates of the Chinese characters commonly used for names or having good meanings based on the Korean language notation of the Korean name, which is the first language name. And, the user can select one of these candidates and include it in the name evaluation's basic information. In the above-described embodiment, an example in which the second language name corresponding to the first language name information is not included in the name evaluation's basic information S304 is described. An example in which the second language name is included in the name evaluation's basic information S304 is described below.

For example, in the case of an internationally married Korean and Japanese couple, when they name their children, they often want to make both Korean and Japanese names for use in Korea and Japan, and often make these two names related to each other. The present embodiment describes a process in which a plurality of first and second language names are made so as to be associated with each other, where the first language name is evaluated based on a second language, the second language name is evaluated based on a first language basis, and the first and second language names are written on a third language basis. For example, in a case where the Hangul notation of the first language Korean name is input "지안", a plurality of name Chinese character notation candidates corresponding to the Hangul notation "지안" are recommended in the system, and each of the name Chinese character notation candidates is the name evaluation's basic information. Then, the Japanese-language usage aspect evaluation and the Japanese-style Chinese character's usage aspect evaluation information are generated for the plurality of name Chinese character notation candidates by the name evaluation process. In this embodiment, for the Chinese character notation "智安" among the various name Chinese character notation candidates, the name's evaluation information of the Chinese character notation corresponding to the Japanese name, which corresponds to the common-use/person's name-use Chinese character in Japanese and is alphabetically denoted by "Tomoyasu" used for the name in Japanese, is generated. The user then selects the is Japanese name corresponding to the alphabetical notation "Tomoyasu" as the alphabetical notation of the second language name, and adds it to the name evaluation's basic information. Then, by changing the target language to Korean or adding Korean through the setting change of the naming basic information, it is possible to generate the name's evaluation information for the second language name based on the Korean language. In addition, if the target language is set as English or Spanish through the change of the naming basic information setting, the system generates name's evaluation information, based on English or Spanish, for the name evaluation's basic information including the Korean name notation ("지안", "Ji An", "智安", etc.), the Korean name pronunciation and the Japanese name notation ("Tomoyasu", "智安", etc.) and the Japanese name pronunciation, such as whether it is perceived as negative in English or Spanish, and whether it is easily pronounced by English or Spanish natives. According to the present invention, it is possible to make a first language name and a second language name that are relevant to each other, to evaluate the first language name based on the target language, to evaluate the second language name based on the first language, and to evaluate the first language name and the second language name based on the third language. Alternatively, the user may set the first language name wish information, "a Chinese character name commonly used as a name in a plurality of Chinese character cultured countries," as the first language name information from the beginning, and set the plurality of target countries as the naming basic information. For example, in a case where "a Chinese character name commonly used as a name in a plurality of Chinese character cultured countries" is set as the first language name information, and the target countries are set as Japan and Korea, the naming system suggests Chinese character notation candidates such as "智安" and "'智元'" used as names in Japanese and Korean. If the user selects "智元" among the candidates, both the Chinese character notation of the first language (Korean) and the Chinese character notation of the second language (Japanese) are designated as "智元" and the information is included in the name evaluation's basic information. Then, through a similar process (input by the user, recommendation information of the system is selected by the user, or automatic generation by the system), the name evaluation's basic information includes the Hangul notation "지안" of the first language (Korean) name and the alphabetic notation "Ji Won" of the first language (Korean) name, the Katakana notation "トモモト" of the second language (Japanese) name, and the alphabetic notation "Tomomoto" of the second language (Japanese) name. Then, the system generates name's evaluation information based on the first, second, and third languages set as the target languages.

As another embodiment, it is possible to set "alphabetical names commonly used as names in a plurality of language-culture-area countries" as the first language name information, and set a plurality of target countries as the naming basic information. For example, if the first language name wish information, "alphabetical notation commonly used as a name in a plurality of language and culture countries," is set to the first language name information, and the target language is set to English and Korean, the naming system presents alphabetical notations such as "Eugene", "Ian", "Dana", "Mina", "Sean", "Sully" used as a name in English and Korean as a candidate group. If the user selects "Sully" among the candidates, both the alphabetical notation of the first language (English) name and the alphabetical notation information of the second language (Korean) name are set to "Sully", and the information is included in the name evaluation's basic information. Then, through a similar process (input of the user, selection of the recommendation information of the system by the user, or automatic generation by the system), the Hangul notation "설리" of the second language (Korean) name and the Chinese notation "雪莉" of the second language (Korean) name are included in the name evaluation's basic information. Then, the system generates name's evaluation information based on the first, second, and third languages set as the target languages. For example, in the name's evaluation information, name's evaluation information is generated that "Sully" is recognized as a female name in the second language Korean, and name's evaluation information is generated that is recognized as a masculine feel in the first language English, and is recognized as a name that comes from the meaning of "sharp eyes" in Kelt, and is recognized as a warrior-like name in the UK, the United States, Ireland, and Canada.

In addition, such name's evaluation information may be generated based on a database already input on the system, but may also be generated by comments from third parties. A plurality of the third party's comments may be input, and another user may conduct re-evaluation or to reliability estimation for the comments of the third party.

The naming system 100 may output such name's evaluation information via the GUI of the user device. In addition, at least one or a combination of the first language name information, the name evaluation's basic information, or the name evaluation's basic information may be output together with the name's evaluation information. The output information may be adjusted in is terms of exposure priority so that the information evaluated by the third party to be highly reliable is displayed at the top.

Figure 6:
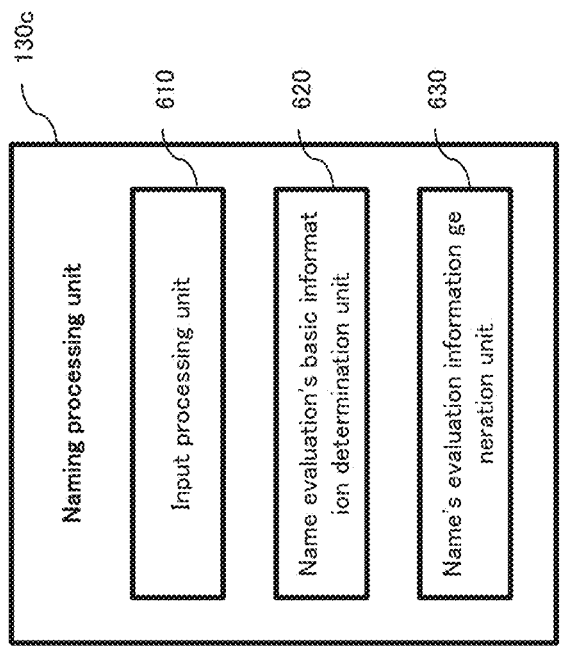
FIG. 6 is a diagram illustrating a structure of a naming processing unit 130c according to an embodiment.

FIG. 6 is a diagram illustrating a structure of a naming processing unit 130c according to an embodiment.

The name processing unit 130c receives the first language name information and/or the name basic information, determines the name evaluation's basic information, and outputs the name's evaluation information. The name processing unit 130c may include an input processing unit 610, a name evaluation's basic information determination unit 620, and a name's evaluation information generation unit 630. Each of the blocks of the name processing unit 130c may correspond to a software processing block generated by executing a given computer program or application, and the software processing block may be variously defined according to an embodiment.

The input processing unit 610 determines the first language name information based on the user input via the user terminal or the input unit. The input processing unit 610 may determine the first language name notation as the first language name information based on the computer character input tool of the first language based on the user input. Further, the input processing unit 610 may determine the first language name notation as the first language name information by removing or modifying the blank, the special symbol, and the like from the user input according to a predetermined criterion. In addition, the input processing unit 610 defines the name basic information input together with the first language name information, and determines the name evaluation's basic information for each item. The input processing unit 610 delivers the first language name information and the naming basic information to the name evaluation's basic information determining unit 620.

Further, the input processing unit 610 may receive the sound directly recorded from the user as the first language name information. Further, the input processing unit 610 may receive the first language name wish information (e.g., a desire for a name that can be written in Chinese characters commonly used in a plurality of languages) and determine it as the first to language name information.

The name evaluation's basic information determination unit 620 determines the name evaluation's basic information based on the first language name information and the naming basic information. The meaning of "determination of the name evaluation's basic information" includes not only automatic generation by the system, but also a case where the user selects a recommendation of the system or the user inputs information from the beginning. The name evaluation's basic information determination unit 620 may determine the name evaluation's basic information with reference to the database according to the name evaluation's basic information determination process described above with reference to FIGS. 3 and 4. The name evaluation's basic information determination unit 620 outputs the generated name evaluation's basic information to the name's evaluation information generation unit 630.

The name's evaluation information generation unit 630 generates name's evaluation information based on the name evaluation's basic information. The name's evaluation information generation unit 630 may generate the name's evaluation information with reference to the database 140 according to the name's evaluation information generation process described above with reference to FIGS. 3 and 4.

The name evaluation's basic information determination unit 620 and the name's evaluation information generation unit 630 may generate the name evaluation's basic information or the name's evaluation information with reference to a database in the devices or a database of an external server.

Figure 7:
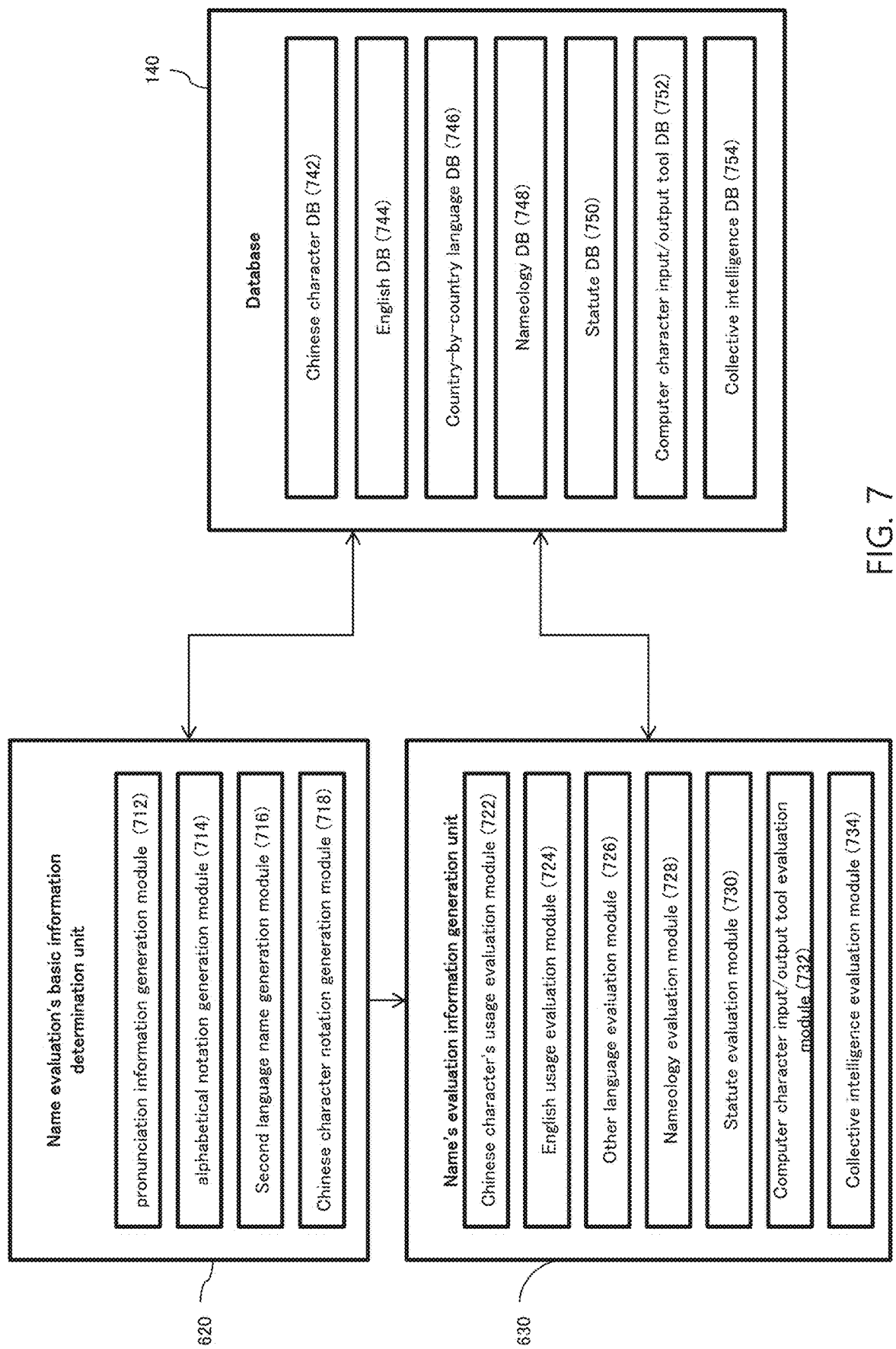
FIG. 7 is a diagram illustrating a structure of a name's evaluation information generation unit and a database according to an embodiment.

FIG. 7 is a diagram illustrating a structure of a name's evaluation information generation unit and a database according to an embodiment. The database 140 in FIG. 7 corresponds to the database 140*a* described above in FIG. 1 or the database 140*b* described in FIG. 2.

The name evaluation's basic information determination unit 620 may include at least one or a combination of the following: a pronunciation information generation module 712, an alphabetical notation generation module 714, a second language name generation module 716, or a Chinese character notation generation module 718. The Chinese character notation generation module 718 may generate a name notation for use in various Chinese character cultured countries individually or in plural. The pronunciation information generation module 712 generates pronunciation information. The alphabetic notation generation module 714 determines the alphabetic notation. The second language name generation module 716 determines a second language name corresponding to the first language name. The information to generation process of each module of the name evaluation's basic information determination unit 620 is as described above in FIGS. 3 and 4.

The name's evaluation information generation unit 630 may include at least one of, or a combination of the followings: a Chinese character's usage evaluation module 722, an English usage evaluation module 724, other language evaluation modules 726, a nameology evaluation module 728, a statute evaluation module 730, a computer character input/output tool evaluation module 732, and a collective intelligence evaluation module 734. The Chinese character's usage evaluation module 722 generates Chinese character's usage aspect evaluation information. The English usage evaluation module 724 generates English usage aspect evaluation information. The other language evaluation module 726 generates language evaluation information set in a target language such as Chinese, Korean, Japanese, etc. The nameology evaluation module 728 generates nameology evaluation information. The statute evaluation module 730 generates statute evaluation information. The computer character input/output tool evaluation module 732 generates computer character input/output tool evaluation information. The collective intelligence evaluation module 734 generates collective intelligence evaluation information. The information generation process of each module of the name's evaluation information generation unit 630 is as described above in FIGS. 3 and 4.

Each module of the name evaluation's basic information determination unit 620 and each module of the name's evaluation information generation unit 630 may correspond to a software processing block generated by a computer program or an application performed in the name processing unit 130*c*, and the software processing block may be variously defined according to the embodiment.

According to one embodiment, each module of the name evaluation's basic information determination unit 620 and each module of the name's evaluation information generation unit correspond to a separate computer program, an application, a software patch, or an additional installation item in the application, and each module may be selectively added to the naming processing unit 130*c* by user selection.

According to one embodiment, the user may further purchase a predetermined module in the name evaluation's basic information determination unit 620 or a predetermined module in the name's evaluation information generation unit using an additional purchase function in the application.

Further, according to an embodiment, when installing a computer program or an application according to the embodiments of the present disclosure in a user terminal or an electronic device, a module corresponding to a basic installation item and a module corresponding to an additional installation item are predefined in the name evaluation's basic information determination unit 620 and the name's evaluation information generation unit 630, the basic is installation item is installed in the user terminal or the electronic device regardless of user selection, and the module corresponding to the additional installation item may be installed according to user selection or installed by additional purchase. According to another embodiment, when installing a computer program or an application according to the embodiments of the present disclosure in a user terminal or an electronic device, a module corresponding to a basic installation item and a module corresponding to an additional installation item are predefined in the name evaluation's basic information determination unit 620 and the name's evaluation information generation unit 630, the basic installation item and the additional installation item are installed in the user terminal or the electronic device, and the module corresponding to the additional installation item is activated by user selection or additional purchase, and may be deactivated if no user is selected or no additional purchase is made.

The database 140 may include at least one or a combination of a Chinese character database 742, an English DB 744, a country-by-country language DB 746, a nameology DB 748, a statute DB 750, a computer character input tool DB 752, or a collective intelligence DB 754. Each DB in the database 140 can be sorted and stored as one of a Chinese character database 742, an English DB 744, a country-by-country language DB 746, a nameology DB 748, a statute DB 750, or a computer character input tool DB 752 based on an area in the storage space or an attribute of each stored information.

The Chinese character DB 742 stores Chinese character information by country, meaning information of each Chinese character, Chinese character components information, and the like. The English DB 744 stores pronunciation rules of English, meaning information of English words, and the like. The country-by-country language DB 746 stores pronunciation rules of the country-by-country language, meaning information of words, gender recognition information on names, and the like. The nameology DB 748 stores country-by-country nameology information. The statute DB 750 stores information such as statutes, passport laws, etc. related to names of countries. The computer character input/output tool DB 752 stores information about the computer character input/output tool for each country's language, information about letters and Chinese characters that can be input/output from each computer character input/output tool, and the like. The collective intelligence DB 754 stores name's evaluation information input by the native language user for the language of each country.

According to one embodiment, each DB in the database 140 is associated with a module of the name evaluation's basic information determination unit 620 or a module of the name's evaluation information generation unit 630, and may be accessible from the naming processing unit 130c only if the associated module is installed or activated. For example, in the application account of the A user, if the nameology evaluation module 728 of the name's evaluation information generation unit 630 is activated by additional purchase, and the statute evaluation module 730 is deactivated, the user terminal or the electronic device may be accessible to the nameology DB 748 via the application account of the A user, and may not be accessible to the statute DB 750.

Figure 8:
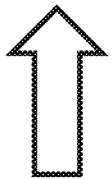
FIGS. 8-10 illustrate a GUI view for name evaluation processing according to one embodiment.
Figure 9:
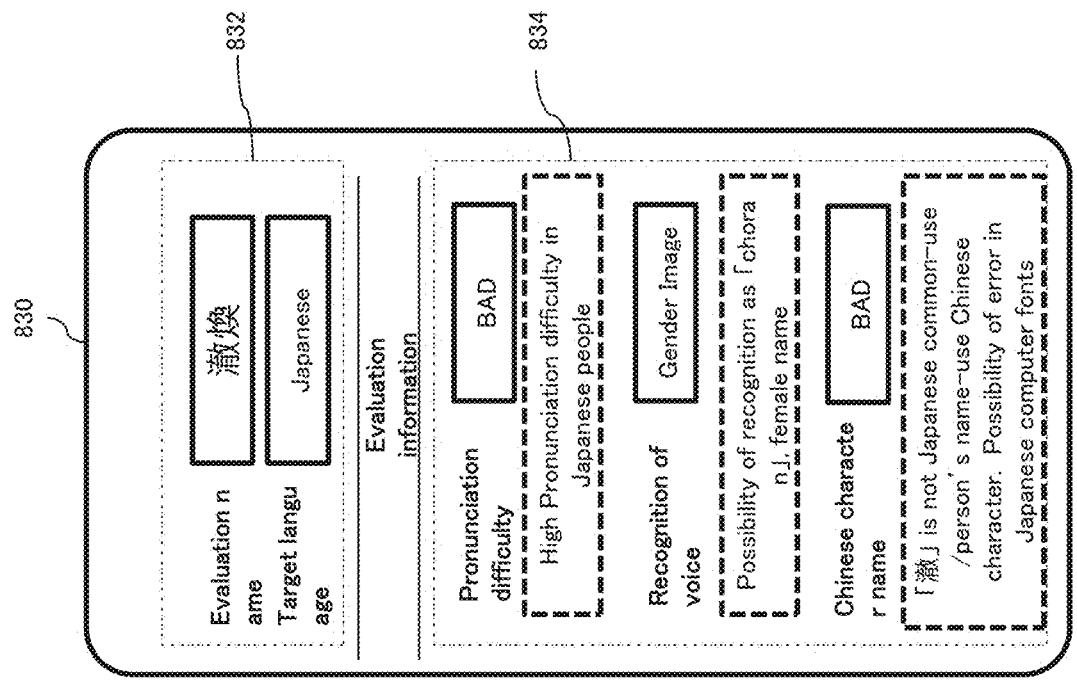
Figure 10:
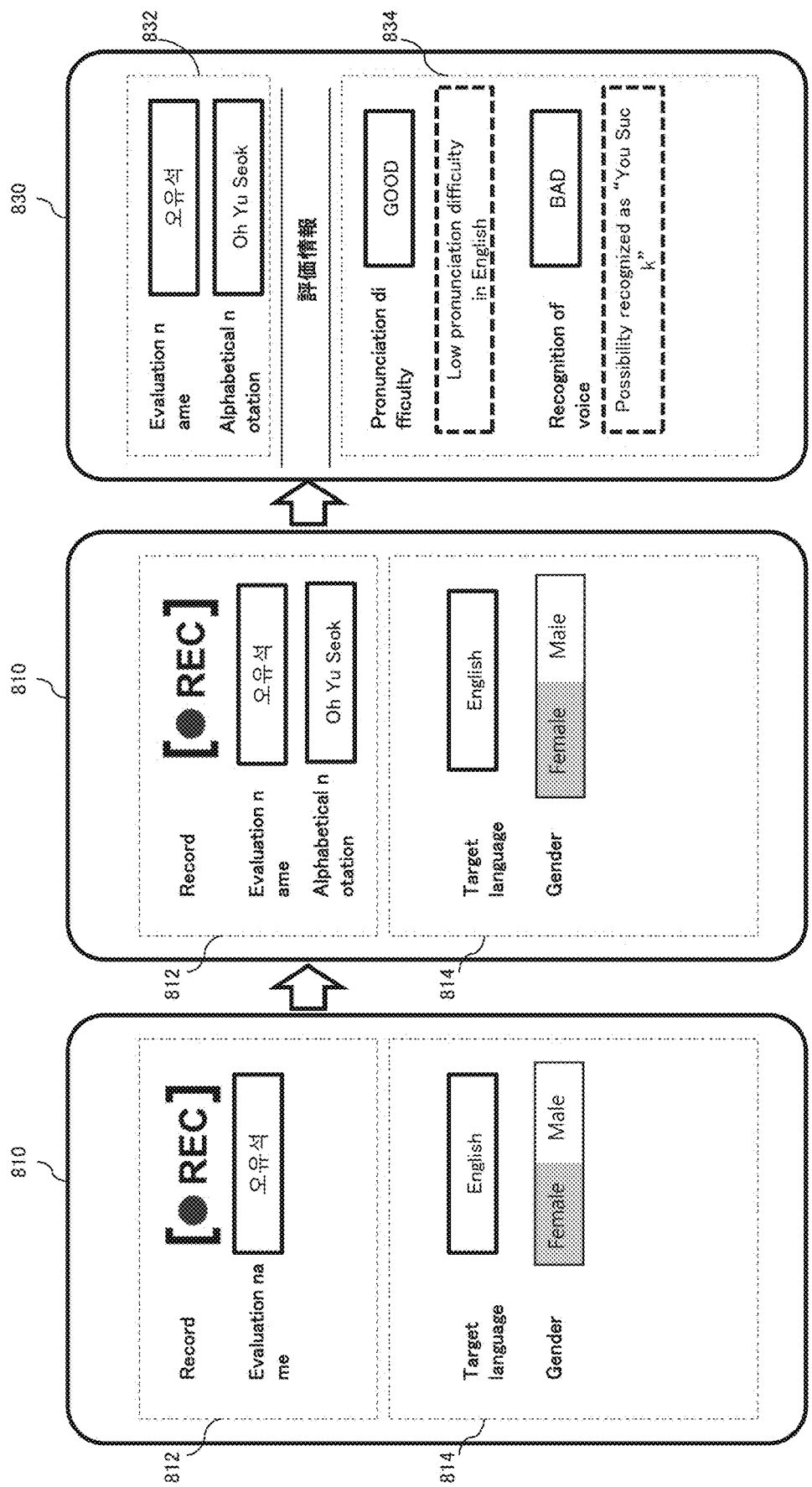

FIGS. 8-10 illustrate a GUI view for name evaluation processing according to one embodiment. According to one embodiment, the naming system 100 provides a first GUI view 810 for receiving first language name information and naming basic information via a GUI of a user terminal or electronic device. For example, the first GUI view 810 includes a first area 812 for receiving first language name information and a second area 814 for receiving naming basic information. In the second region 814, for each input item, the mandatory input information and the optional input information can be displayed separately. If the evaluation name is a person's name, last name and first name may be input separately.

The naming system 100 provides a second GUI view 830 for displaying name's evaluation information via a GUI of a user terminal or electronic device. The second GUI view 830 can display the first language name information, the naming basic information, or the name evaluation's basic information together with the name's evaluation information. According to one embodiment, the second GUI view 830 may include a third area 832 representing the information to be evaluated and a fourth area 834 representing the name's evaluation information. In the third area 832, a combination of information included in the name evaluation's basic information may be displayed. In the fourth area 834, a combination of information included in the name's evaluation information may be displayed.

In the embodiment shown in FIG. 10, a case is shown in which after the first language name information (name Hangul notation: 오유석) is input by the user for the first time in the first region 812, the alphabetical notation (Oh Yu Seok) of the first language (Korean) name is added to the name evaluation's basic information and displayed in the first region 812 and the third region 832 together.

Alternatively, the GUI may generate and output only name's evaluation information that is likely to be negatively recognized if a user simply inputs a name that requests evaluation and presses a system execution button.

Figure 11:
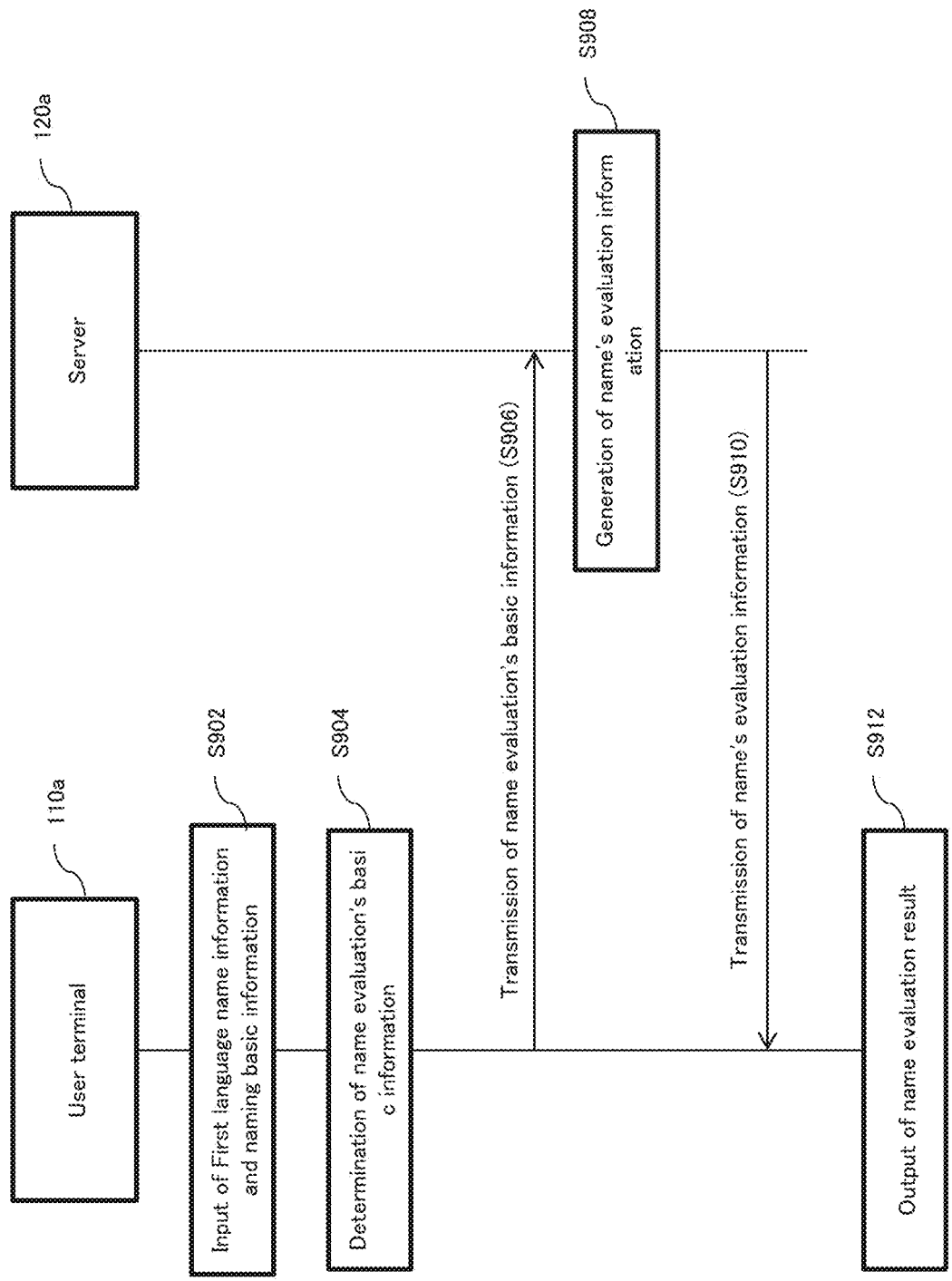
FIG. 11 is a flow chart illustrating a method for controlling a naming system according to an embodiment.

FIG. 11 is a flow chart illustrating a method for controlling a naming system according to an embodiment.

Each of the operations of the naming system control method may be performed and distributed by a plurality of devices included in the naming system. According to one embodiment, the naming system includes a user terminal 110a and a server 120a, and operations of the naming system control method may be performed by the user terminal 110a and the server 120a.

According to one embodiment, the user terminal 110a receives the first language name information and the naming basic information S902 and may determine the name evaluation's basic information based on the input first language name information and the naming basic information by user input, user selection among system recommendation candidates, or system automation S904. The user terminal 110a sends the name evaluation's basic information to the server 120a S906. The name evaluation's basic information includes the first language name information and the naming basic information as it is, and other information is added. The server 120a generates name's evaluation information based on the name evaluation's basic information from the user terminal 110a S908, and transmits the name's evaluation information to the user terminal 110a S910. The user terminal 110a receives the name's evaluation information from the server 120a and outputs it through the GUI view S912.

Figure 12:
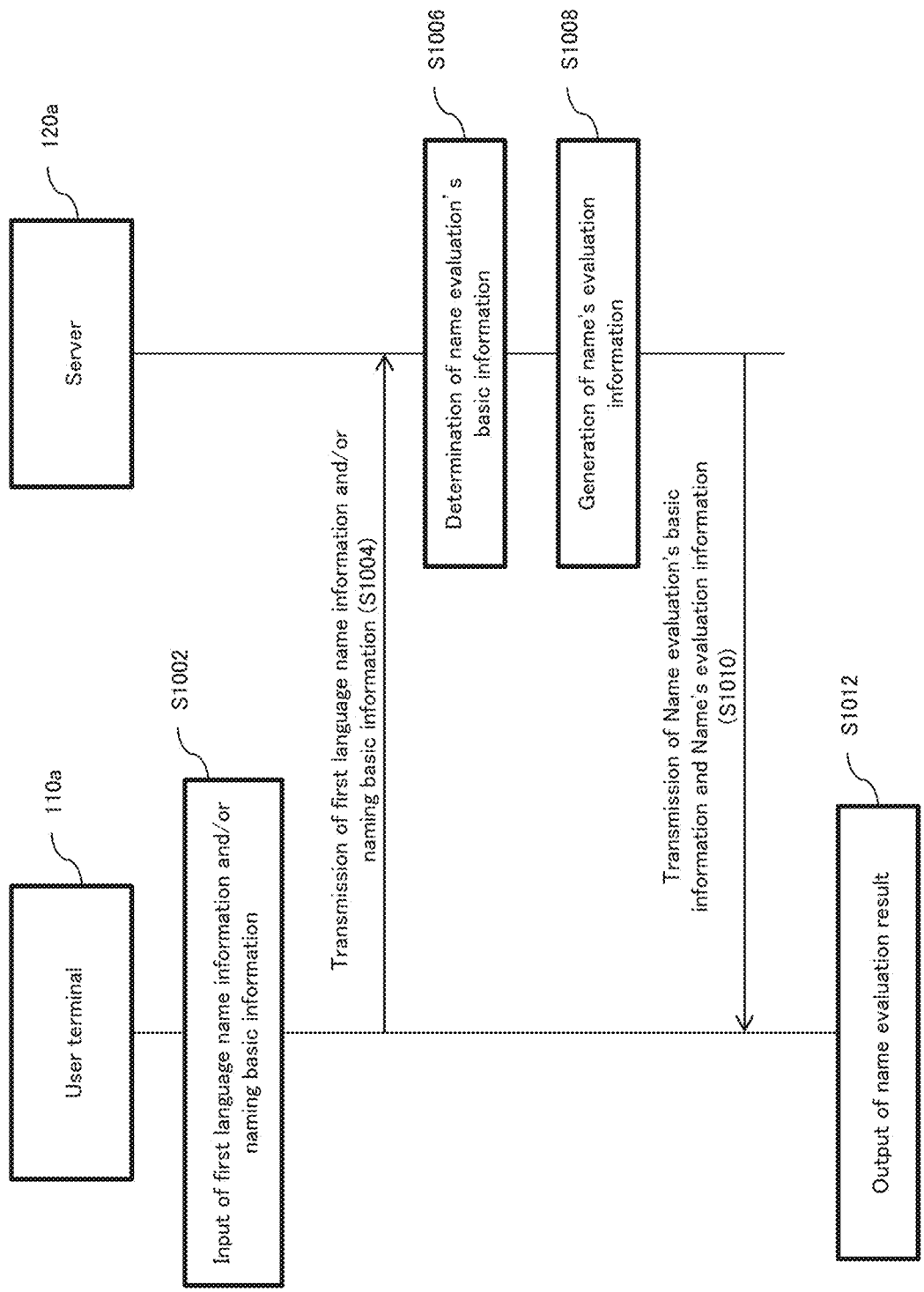
FIG. 12 is a flow chart illustrating a method for controlling a naming system according to an embodiment.

FIG. 12 is a flow chart illustrating a method for controlling a naming system according to an embodiment.

According to one embodiment, the naming system includes a user terminal 110a and a server 120a, and operations of the naming system control method may be performed by the user terminal 110a and the server 120a.

According to one embodiment, the user terminal 110a receives the first language name information and the naming basic information S1002, and transmits the input first language to name notation and the name evaluation's basic information to the server 120a S1004. The server 120a receives the first language name information and the naming basic information, and determines S1006 the name evaluation's basic information in the system based on the first language name information and the naming basic information. Further, the server 120a generates name's evaluation information based on the name evaluation's basic information S1008. The server 120a sends the name evaluation's basic information and the name's evaluation information to the user terminal 110a S1010. The user terminal 110a receives the name evaluation's basic information and the name's evaluation information from the server 120a and outputs them through the GUI view S1012.

Figure 13:
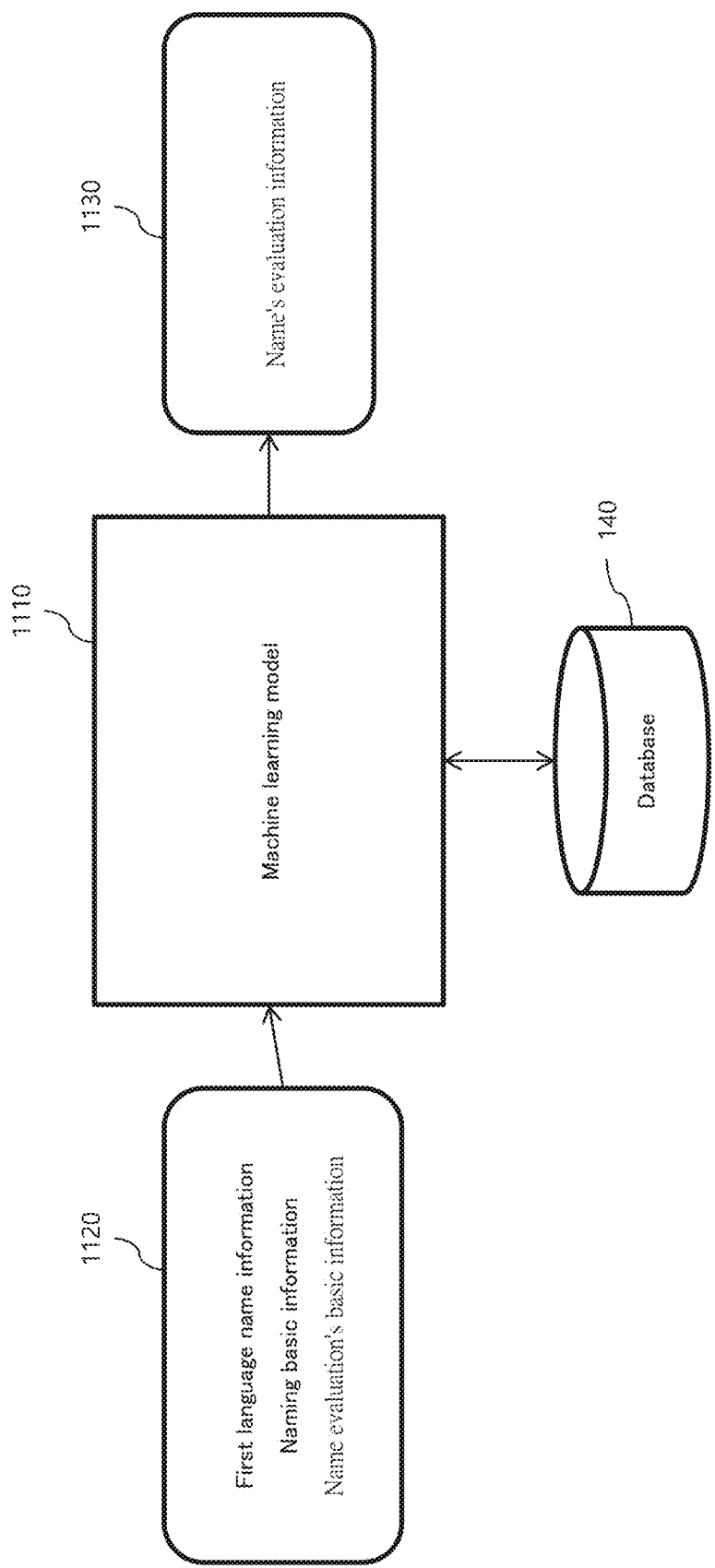
FIG. 13 is a diagram illustrating a process of generating name's evaluation information according to one embodiment.

FIG. 13 is a diagram illustrating a process of generating name's evaluation information according to one embodiment.

According to one embodiment, the name processing units 130a, 130b may generate name's evaluation information using the machine learning model 1110. The machine learning model 1110 is a model learned based on multiple training data including first language name information, naming basic information, name evaluation's basic information, and name's evaluation information. The machine learning model 1110 may be provided inside the naming processing units 130a and 130b, or may be provided in an external device or an external server. Machine learning model 1110 may generate output data 1130 from input data 1120 with reference to database 140.

The machine learning model 1110 may have a deep neural network structure, for example. The machine learning model may be learned using training data based on one or more nodes and computational rules between nodes. The structure of the node, the structure of the layer, and the rules of operation between the nodes may be variously determined according to the embodiment. The machine learning model 1110 includes hardware resources such as one or more processors, memories, registers, summation processing units, multiplication processing units, character string parsing units, and the like, and operates the hardware resources based on a set of parameters applied to each hardware resource. To this end, the processor that operates the machine learning model 1110 may perform a task or resource management process of allocating hardware resources for each operation of the machine learning model 1110. The machine learning model 1110 may have a structure such as, for example, a Recurrent Neural Network (RNN), a Long Short-Term Memory (LSTM), or the like.

The naming processing units 130*a* and 130*b* may input the first language name information to and the naming basic information 1120 to the machine learning model 1110, and obtain the name's evaluation information 1130 from the machine learning model 1110. According to the embodiment, the naming processing units 130*a* and 130*b* may input the first language name information and the naming basic information to the machine learning model 1110, or input the first language name information, the naming basic information, and the name evaluation's basic information to the machine learning model 1110.

In a machine learning model in accordance with an embodiment of the present invention, a set of training names and one or more name's evaluation information associated with the training names are used to learn a deep neural network structure.

Further, when new to-be-evaluated name information is input, based on the machine learning result, a name evaluation result corresponding to the new to-be-evaluated name information is generated from existing data and output as a new name evaluation result. Then, the new to-be-evaluated name information and the new name evaluation result data are used for re-learning the machine learning model.

Figure 14:
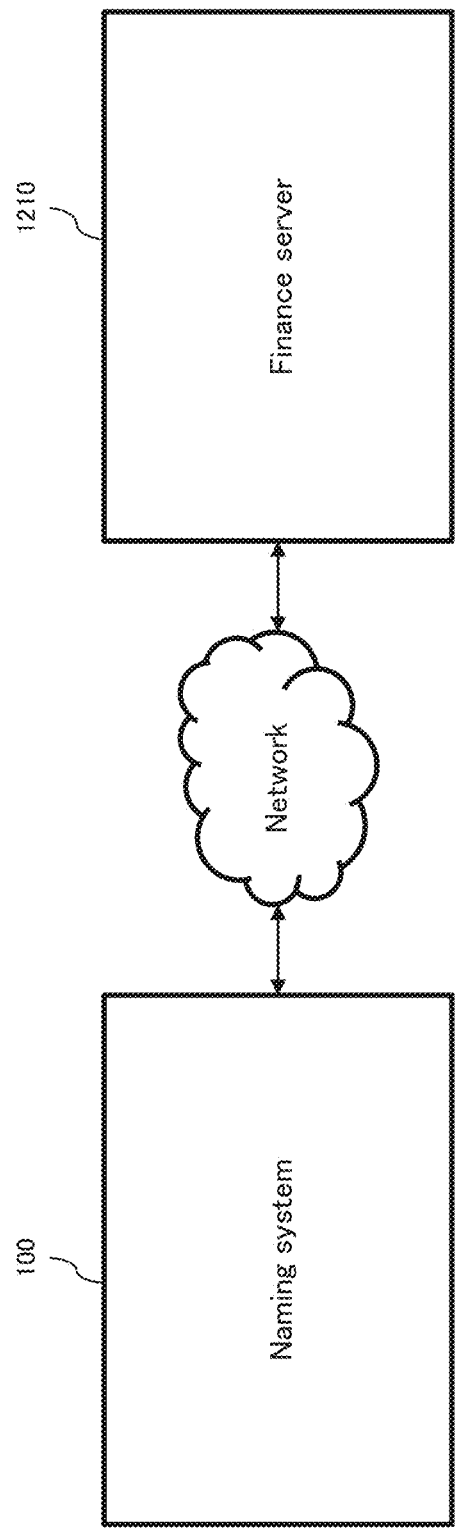
FIG. 14 illustrates a system including a naming system and a financial server according to one embodiment.

FIG. 14 illustrates a system including a naming system and a financial server according to one embodiment.

According to one embodiment, the naming system 100 may operate in connection with the financial server 1210. The naming system 100 according to one embodiment may charge a user for a name evaluation service, or use the name evaluation service to obtain advertising revenue. As such, the naming system 100 may be connected to the financial server 1210 for charging or revenue generation related to the name evaluation service.

Figure 15:
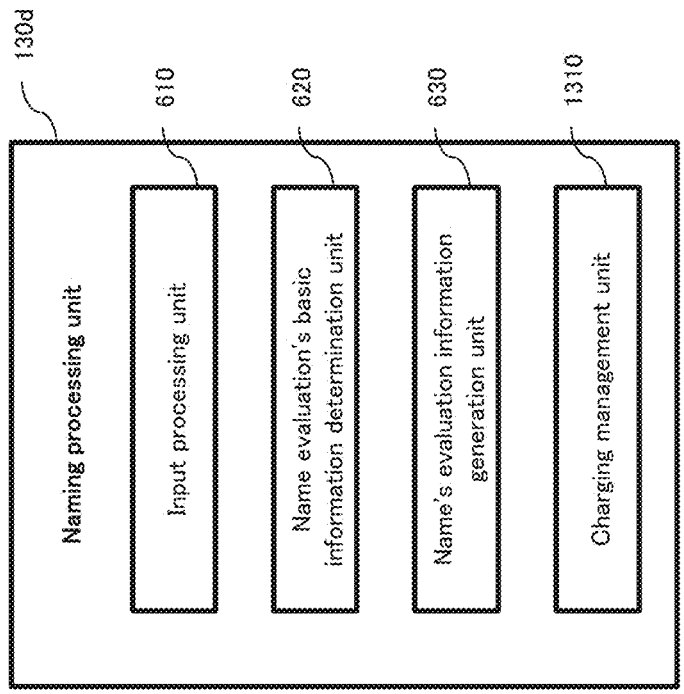
FIG. 15 is a diagram illustrating a structure of a naming processing unit 130d according to an embodiment.

FIG. 15 is a diagram illustrating a structure of a naming processing unit 130*d* according to an embodiment.

According to one embodiment, the name processing unit 130*d* includes an input processing unit 610, a name evaluation's basic information determination unit 620, a name's evaluation information generation unit 630, and a charging management unit 1310. The input processing unit 610, the name evaluation's basic information determination unit 620, and the name's evaluation information generation unit 630 in FIG. 15 correspond to the input processing unit 610, the name evaluation's basic information determination unit 620, and the name's evaluation information generation unit 630 in FIG. 6, and therefore redundant description is omitted.

The charging management unit 1310 performs charging via the financial server 1210 on the name evaluation processing performed by the naming system 100. The naming system 100 may have certain charging criteria for the name evaluation service. According to one embodiment, the naming system 100 may charge a service fee for a user account, in units of a combination of the first language name notation and the name evaluation's basic information. In accordance with another embodiment, the naming system 100 may charge an advertisement provider based on the number of advertisements exposed in the GUI view for providing the name evaluation service, the exposure time, etc. The charging management unit 1310 determines a service usage amount for a user account or an advertisement provider based on a predetermined charging criterion, and charges the predetermined service usage amount to the user account or the advertisement provider. Further, the charging management unit 1310 receives the service usage amount charged to the user account or the advertisement provider via the financial server 1210.

Figure 16:
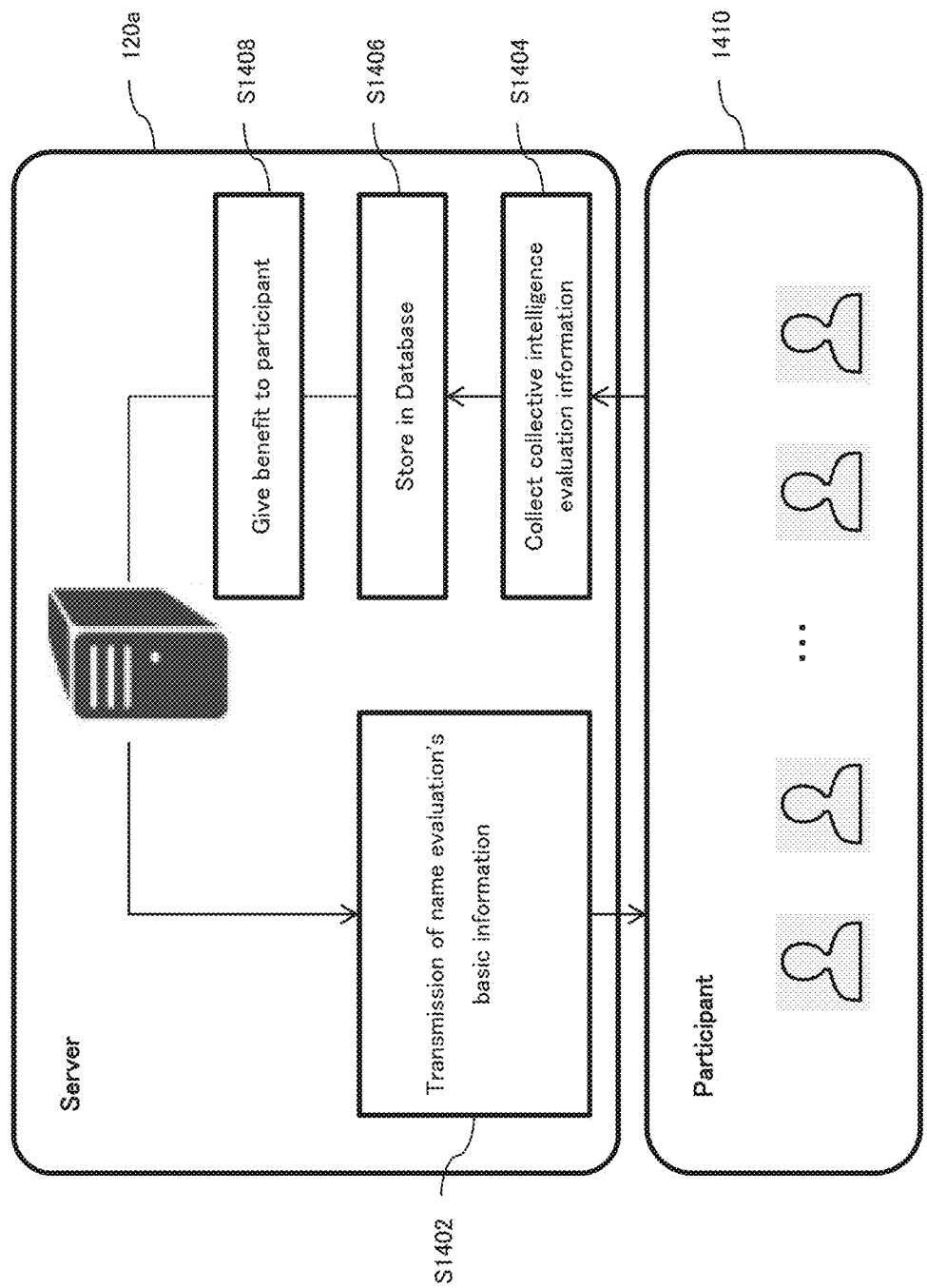
FIG. 16 is a diagram for explaining a process of collecting collective intelligence evaluation information according to an embodiment.

FIG. 16 is a diagram for explaining a process of collecting collective intelligence evaluation information according to an embodiment.

According to one embodiment, the naming system 100 may collect collective intelligence evaluation information for the to-be-evaluated name from multiple participants 1410 and store the collective intelligence evaluation information in a database to generate the collective intelligence evaluation information for the name evaluation's basic information from the collective intelligence evaluation information of the database. The name evaluation's basic information includes name notation, name pronunciation, and the like determined by the naming system 100 based on the first language name information and/or the naming basic information. The naming system 100 may request a name evaluation from the participant 1410 for the name evaluation's basic information. Participant 1410 may be a user using a name evaluation service, or may be a participant who has been requested a collective intelligence evaluation.

The server 120*a* collects language information that the participant 1410 has knowledge, provides name evaluation's basic information, and outputs a query item to collect the collective intelligence evaluation information (S1402). The server 120*a* receives the language knowledge information of the participant 1410 from the terminal of the participant 1410 to determine at least one to-be-evaluated name that the participant 1410 can evaluate. The server 120*a* may provide the participant 1410 with the name evaluation's basic information of the to-be-evaluated name, output a query item, and provide a GUI for collecting the evaluation result.

Next, the server 120*a* collects collective intelligence evaluation information for the to-be-evaluated name information from the participant 1410 S1404. The server 120*a* provides the to-be-evaluated name information in which the language that the participant 1410 knows is set to the target language, and outputs a predetermined query item for collecting the collective intelligence evaluation information. In addition, the server 120*a* collects the answer of the is participant 1410 to the query item, and collects it as collective intelligence evaluation information for the to-be-evaluated name information. The server 120*a* may provide the name evaluation's basic information together with the to-be-evaluated name information. At this time, the participant 1410 may evaluate the entire character or pronunciation of the to-be-evaluated name, or may select apart thereof and evaluate it. Once the participant 1410 selects a portion of the pronunciation, he or she may play the area he or she has selected and check if it has been selected as intended.

The server 120*a* stores the collected collective intelligence evaluation information in the database 140 (S1406). The database 140 may classify and store collective intelligence evaluation information in various languages.

Next, the server 120*a* pays compensation to the participant 1410 who provided the collective intelligence evaluation result (S1408). The reward of the participant 1410 may be communicated to the account of the participant 1410 or the contact, email, or the like input by the participant. According to one embodiment, a participant 1410 account may be rewarded by a right to use the name evaluation service or points to pay for the name evaluation service. According to another embodiment, an electronic coupon, point, virtual currency, or the like may be sent to a phone number, email, or the like input by the participant 1410.

Figure 17:
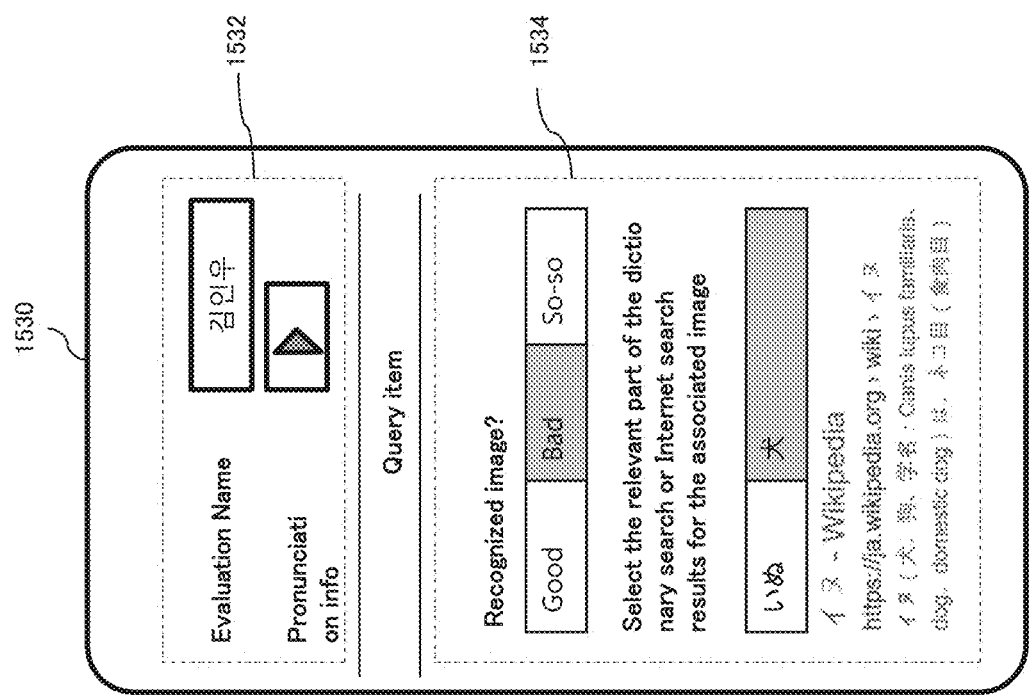
FIG. 17 is a diagram illustrating a GUI view for collecting collective intelligence evaluation information according to one embodiment.
Figure 17:
Figure 17:
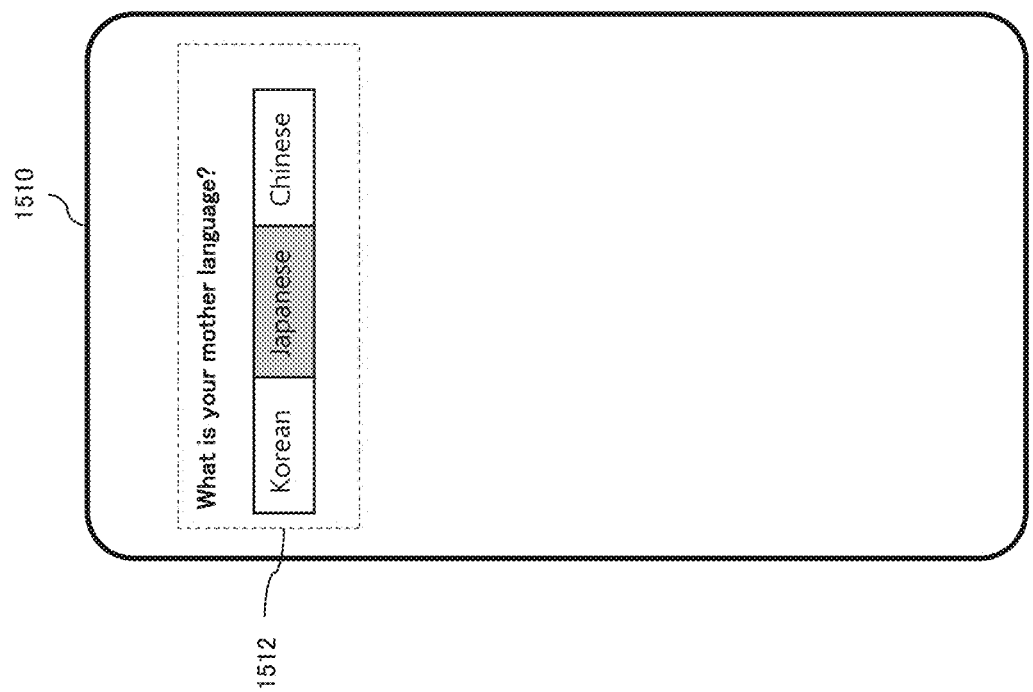

FIG. 17 is a diagram illustrating a GUI view for collecting collective intelligence evaluation information according to one embodiment.

The server 120*a* may provide a GUI for collecting collective intelligence evaluation information via the user terminal. First, the server 120*a* collects the language information of the participant 1410 via the first collective intelligence GUI view 1510. To this end, the first collective intelligence GUI view 1510 provides a query item 1512 that queries the language knowledge of the participant 1410.

Next, when the language knowledge information of the participant 1410 is input, the server 120*a* selects the to-be-evaluated name information in which the language in which the to participant 1410 has knowledge is set to the target language, and outputs the to-be-evaluated name information to the 1532 area through the second collective intelligence GUI view 1530. The second collective intelligence GUI view 1530 may output at least a portion of the name evaluation's basic information together with the to-be-evaluated name information to the 1532 area. For example, information such as pronunciation voice information of a name, gender, date of birth, etc. may be output together with the to-be-evaluated name information.

Further, the second collective intelligence GUI view 1530 outputs at least one query item for the to-be-evaluated name information to the 1534 area. The query item may include, for example, a query item for an image for the to-be-evaluated name information, a query item for a gender expected from the to-be-evaluated name information, a query item for the distinctiveness of the to-be-evaluated name, a query item for whether there is a negative meaning associated with the to-be-evaluated name information, and the like. The query item may be output in the native language of the evaluator or the language selected by the evaluator. It may also be configured so that the evaluator can textually describe the evaluation of the query item or select it in a multiple-choice response format. In addition, if an evaluator associates a negative meaning with the to-be-evaluated name information, the system may be configured to allow an internet search or pre-search so that the evaluator can easily answer the negative meaning, and the relevant part of the search results may be selected to explain the negative meaning. For information in the search results in which the evaluator's specified information is in the evaluator's mother language, a machine translation may be provided so that the evaluation requestor's mother language information can check the meaning, or a relevant part of the evaluator's mother language-evaluation requestor's mother language dictionary (e.g., Japanese-Korean dictionary) may be output so that the evaluator can easily check the relevant information.

The server 120*a* collects an answer to the query item input via the second collective intelligence GUI view 1530 as collective intelligence evaluation information and stores it in the database 140.

Figure 18:
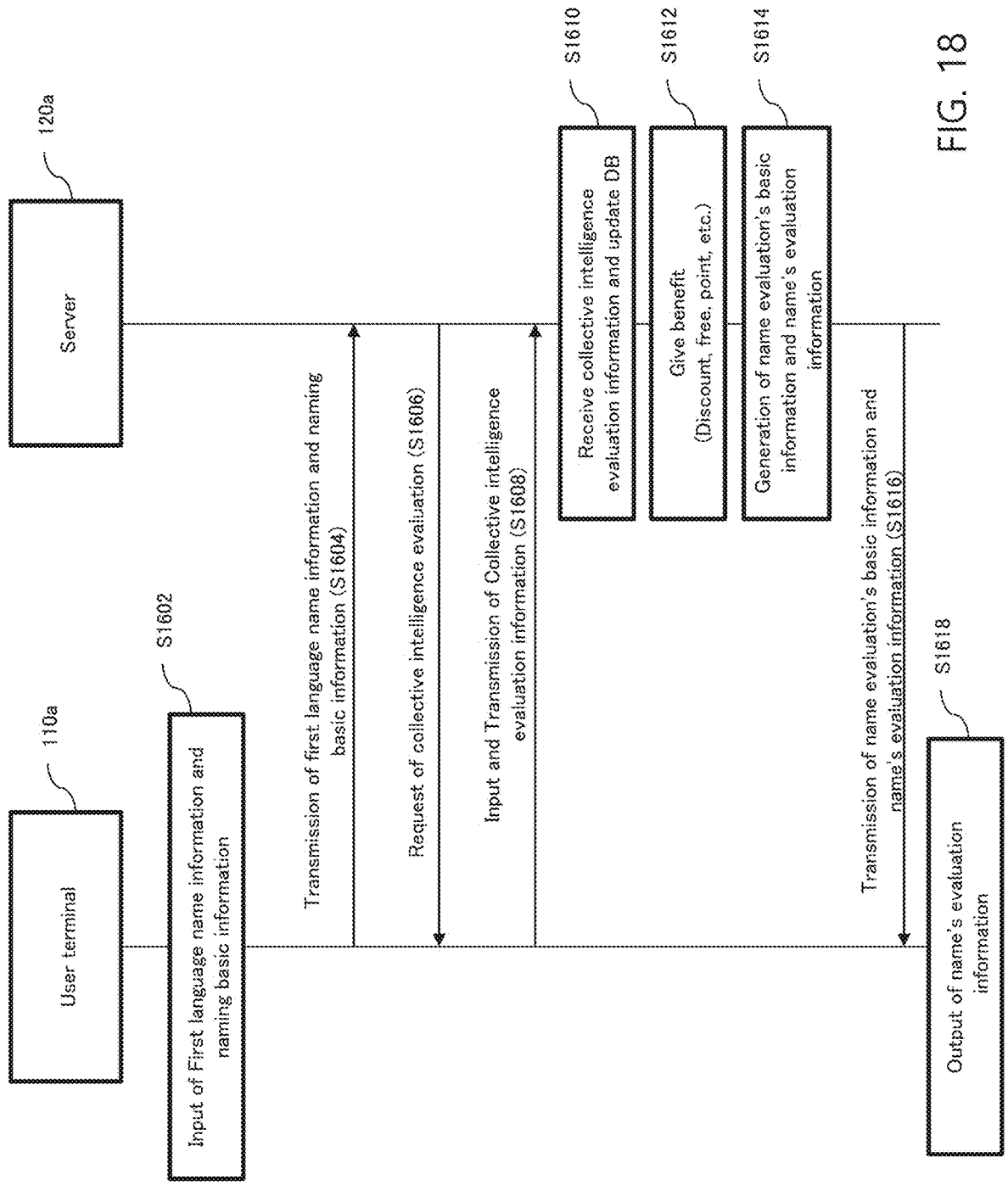
FIG. 18 is a flow chart illustrating a method for controlling a naming system according to an embodiment.

FIG. 18 is a flow chart illustrating a method for controlling a naming system according to an embodiment.

According to one embodiment, the naming system 100 may request a user who has asked for a name evaluation service to perform a collective intelligence evaluation, and upon completion of the performance of the collective intelligence evaluation, provide name evaluation's basic information and/or name's evaluation information for the name evaluation service that the user has asked for. Through this, the user can use the name evaluation service free of charge in return for providing the collective intelligence evaluation information, and the naming system 100 can collect the collective intelligence evaluation information in the process of providing the name evaluation service. In such a case, the revenue for the name evaluation service may be obtained through advertising exposure revenue.

First, the user terminal 110*a* receives the first language name information and the naming basic information from the user to use the name evaluation service S1602. The user terminal 110*a* transmits the input first language name information and the naming basic information to the server 120*a* S1604. According to one embodiment, the user terminal 110*a* may separately transmit the name evaluation service application along with the first language name information and the naming basic information. According to another embodiment, the server 120*a* may consider receipt of the first language name notation and naming basic information as a name evaluation service request.

Upon receiving the first language name information and the naming basic information, the server 120*a* sends a collective intelligence evaluation request to the user terminal 110*a* that asked for the name evaluation service S1606. The collective intelligence evaluation request includes a process S1402 of providing the user with the first language name information and the naming basic information that the other user has requested to evaluate as described above. To this end, the server 120*a* may output a first collective intelligence GUI view 1510 and a second collective intelligence GUI view 1530 to the user terminal 110*a* as previously described in FIG. 17.

The user terminal 110*a* receives, in response to the collective intelligence evaluation request, the collective intelligence evaluation information from the user, and sends the input collective intelligence evaluation information to the server 120*a* S1608.

The server 120*a* updates the collective intelligence evaluation DB of the database 140 using the collective intelligence evaluation information received from the user terminal 110*a* S1610. The server 120*a* may charge the user's name evaluation service application at a discounted price or provide the name evaluation service for free S1612 once the collective intelligence evaluation information is received. To this end, the server 120*a* prepares and sends an invoice with a discount or free charging policy to the user terminal 110*a*.

The server 120*a* generates S1614, for the first language name information and the naming basic information received from the user terminal 110*a*, the name evaluation's basic information and the name's evaluation information, and sends S1616 the name evaluation's basic information and the name's evaluation information to the user terminal 110*a*, when the payment for the name evaluation service is completed, or free service is determined. The user terminal 110*a* outputs the received name's evaluation information via the GUI S1618.

Alternatively, in order for a user to be evaluated for a specific name, the user may make a payment on the system to obtain a virtual currency point and configure the billing system to use it for name evaluation. The virtual currency point may be provided free of charge if it contributes to an increase in data quantity or an increase in reliability of the name's evaluation information even without making a payment.

In addition, more free points may be awarded in the case of contributing to the additional increase of the name's evaluation information data for the foreign language name from the perspective of the other language users.

According to the name evaluation system utilizing such collective intelligence, the user who intends to be evaluated for a specific name actively cooperates with the quantitative increase of the data for name evaluation, and thus the amount and quality of the data of the name evaluation system itself gradually increases.

Figure 19:
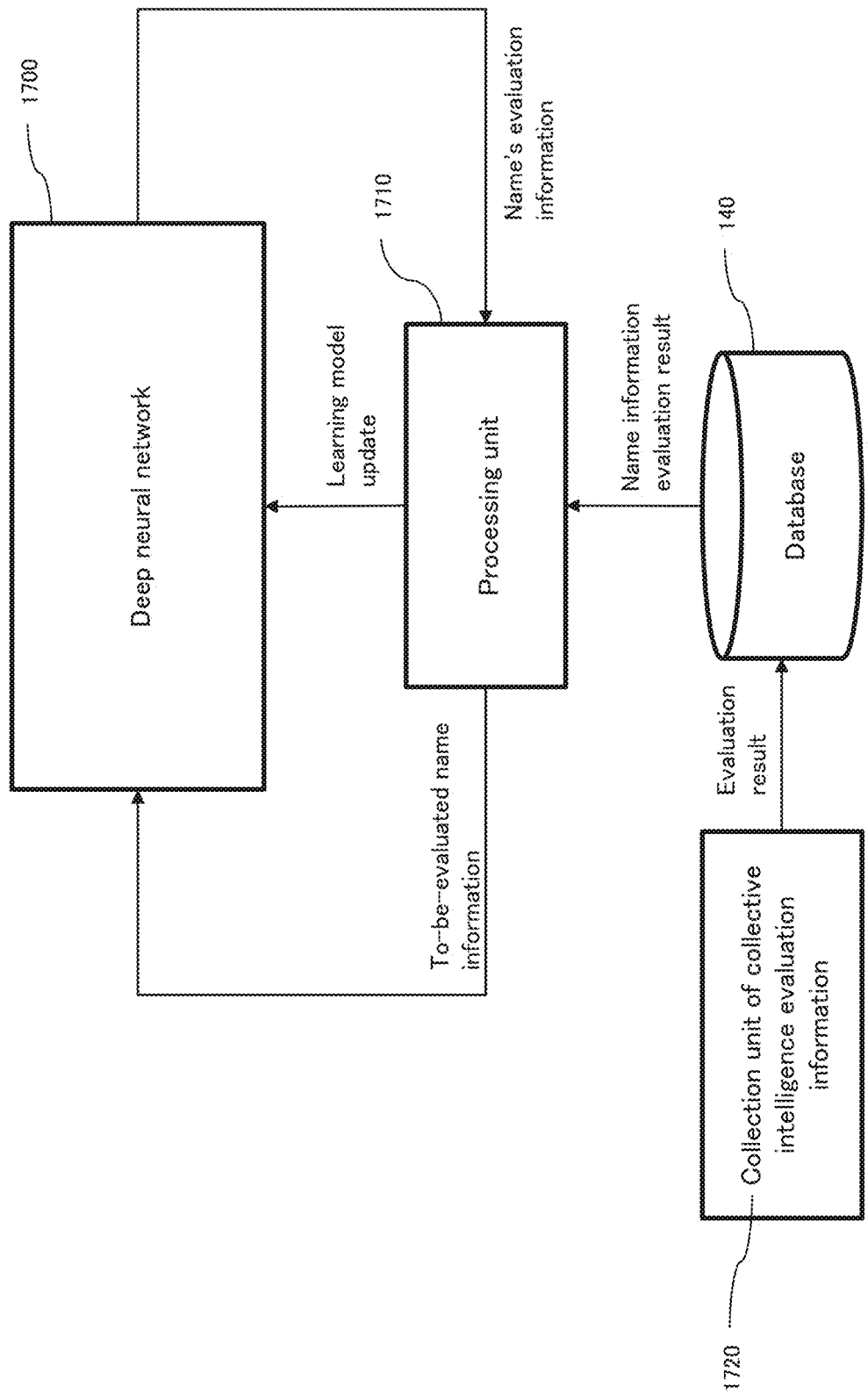
FIG. 19 is a diagram illustrating a configuration of updating a machine learning model using collective intelligence evaluation information according to an embodiment.

FIG. 19 is a diagram illustrating a configuration of updating a machine learning model using collective intelligence evaluation information according to an embodiment of the present disclosure.

According to one embodiment of the present disclosure, the naming system 100 re-learns the machine learning model 1700, using the collective intelligence evaluation results. The machine learning model 1700 is part of the machine learning model 1700 described above in FIG. 13, and may correspond to the machine learning model 1700 that generates evaluation information for a name. The naming system 100 may include a machine learning model 1700, a re-learning processing unit 1710, a collective intelligence evaluation information collection unit 1720, and a database 140. The machine learning model 1700, the re-learning processing unit 1710, and the collective intelligence evaluation information collection unit 1720 may be included in the naming processing units 130a. 130b, and 130c described above. The machine learning model 1700, the re-learning processing unit 1710, and the collective intelligence evaluation information collection unit 1720 may be implemented as one processor or as separate processors. In addition, the machine learning model 1700, the re-learning processing unit 1710, and the collective intelligence evaluation information collection unit 1720 may each correspond to at least one software processing block, and the software processing block may be defined in various ways.

The collective intelligence evaluation information collection unit 1720 collects the collective is intelligence evaluation information according to the embodiment described in at least one of FIG. 16 to 18 above. The collective intelligence evaluation information includes the to-be-evaluated name information provided for the evaluation request and the collective intelligence evaluation result input by the participant. The collective intelligence evaluation information collection unit 1720 may provide a GUI view for requesting a collective intelligence evaluation to a participant's terminal, and receive a collective intelligence evaluation result from the participant's terminal. The collective intelligence evaluation information collection unit 1720 may communicate with the participant terminal using a predetermined communication interface.

The collective intelligence evaluation information collection unit 1720 stores the collected collective intelligence evaluation information in the database 140. The database 140 may store the collective intelligence evaluation information as learning data.

The collective intelligence evaluation information collection unit 1720 outputs the collected collective intelligence evaluation information to the re-learning processing unit 1710. The re-learning processing unit 1710 re-learns the machine learning model 1700 using the collective intelligence evaluation information. First, the re-learning processing unit 1710 inputs the to-be-evaluated name information (character notation or voice) included in the collective intelligence evaluation information into the machine learning model 1700. The machine learning model 1700 generates name's evaluation information based on the input to-be-evaluated name information. The re-learning processing unit 1710 compares the name's evaluation information output from the machine learning model 1700 with the collective intelligence evaluation information input from the collective intelligence evaluation information collection unit 1720, and updates the machine learning model 1700 according to the comparison result. The re-learning processing unit 1710 modifies the parameter value of the machine learning model 1700 to update the machine learning model 1700, and regenerates the name's evaluation information based on the first language name information and the name basic information, when the evaluation result of the collective intelligence evaluation to information is different from the name's evaluation information output from the machine learning model 1700. The re-learning processing unit 1710 repeats the update of the machine learning model 1700 and the name's evaluation information reproduction processing, and updates the machine learning model 1700 until the name's evaluation information and the evaluation result of the collective intelligence evaluation information match in a predetermined is range or more.

Figure 20:
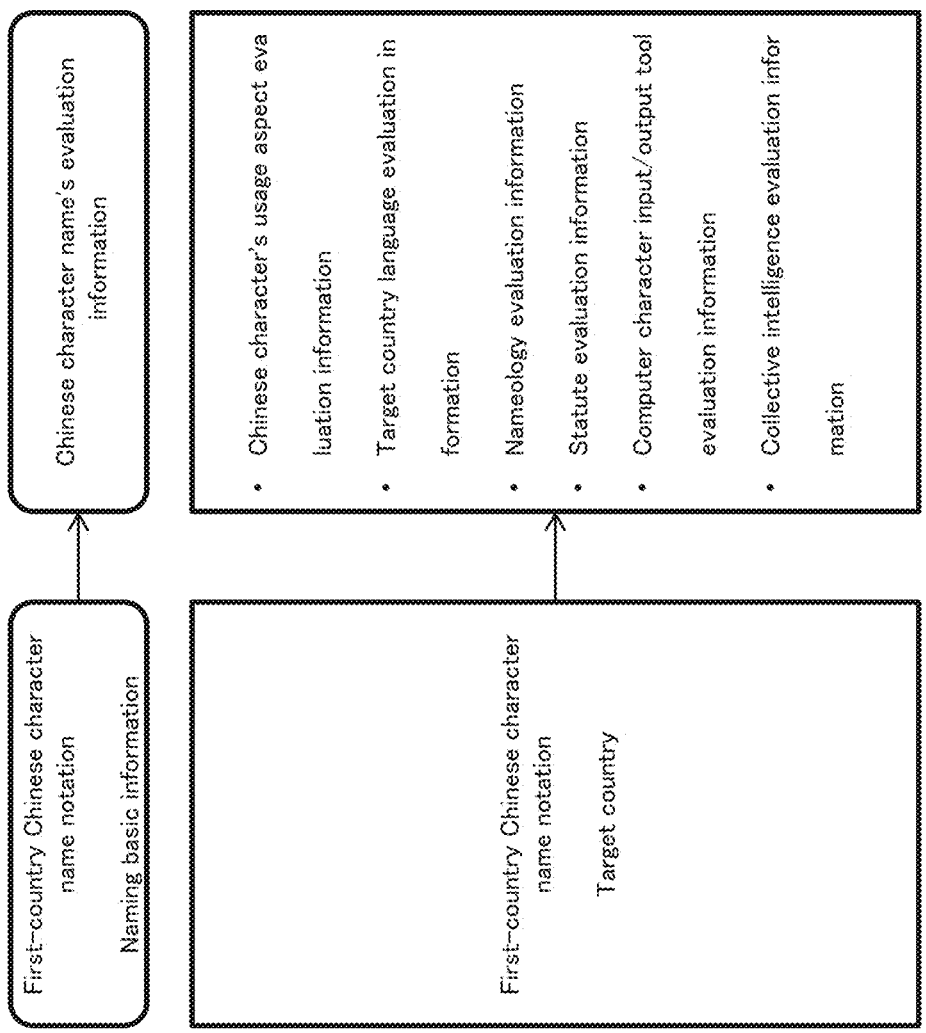
FIG. 20 is a diagram for explaining a process of generating Chinese character name's evaluation information from a first-country Chinese character name according to an embodiment.

FIG. 20 is a diagram for explaining a process of generating Chinese character name's evaluation information from a first-country Chinese character name according to an embodiment.

According to one embodiment, the naming system 100 may receive the first-country Chinese character name notation and/or the naming basic information to generate the Chinese character name's evaluation information for the first-country Chinese character name notation on a second-country basis. The naming system 100 may receive the first-country Chinese name notation and the target country information, and use the information of the database 140 to generate the Chinese character name's evaluation information. The Chinese character name's evaluation information may include at least one of, or a combination of, the following on a target country basis: Chinese character's usage aspect evaluation information, target country language evaluation information, nameology evaluation information, statute evaluation information, computer character input tool evaluation information, or collective intelligence evaluation information.

The naming system 100 generates, for the first-country Chinese character name notation, Chinese character's usage aspect evaluation information on a target country basis. The Chinese character's usage aspect evaluation information may include information on whether the first-country Chinese character name notation is Chinese character used in the target country, whether the first-country Chinese character name notation is used in the target country as a person's name-use Chinese character, whether the Chinese characters included in the first-country Chinese character name notation are Chinese characters having a negative meaning in the target country, etc. The naming processing units 130a and 130b may generate the Chinese character's usage aspect evaluation information with reference to the Chinese character DB 742 of the database 140.

The naming system 100 generates second language evaluation information on a second language basis, which is the language of the target country. The naming system 100 may convert the first-country Chinese name notation into a second language name notation, and to generate, based on a database for the second language, second language name notation including semantic evaluation information, pronunciation evaluation information, gender-based evaluation information, name appropriateness information, and the like recognized by the second language name notation.

In addition, the naming system 100 may generate, for the first-country Chinese character name notation, the nameology evaluation information, the decree evaluation information, the computer character input tool evaluation information, and the collective intelligence evaluation information described above with reference to FIGS. 3 and 4 on a target country basis.

Figure 21:
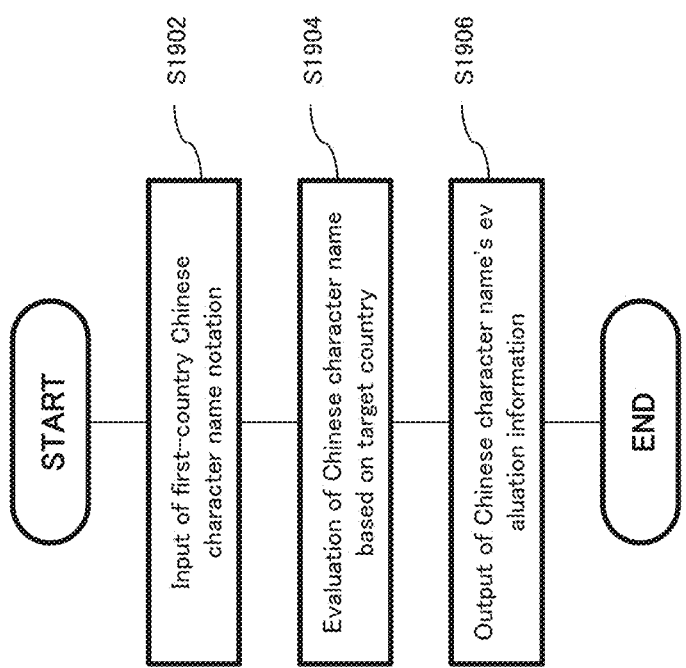
FIG. 21 is a flow chart illustrating a method for controlling a naming system according to an embodiment.

FIG. 21 is a flowchart illustrating a method for controlling a naming system according to an embodiment of the present disclosure.

According to one embodiment, the naming system 100 is input with a first-country Chinese character name notation S1902. Next, the naming system 100 generates, for the first-country Chinese name notation, Chinese character name's evaluation information on a target country basis S1904. Next, the naming system 100 outputs the Chinese character name's evaluation information via the user terminal or the electronic device S1906.

Figure 22:
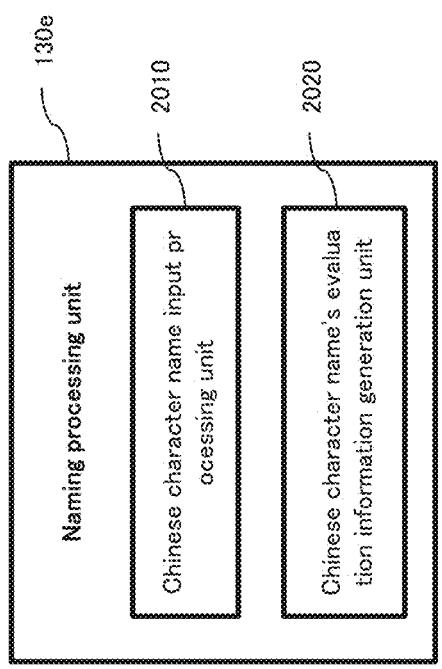
FIG. 22 is a diagram illustrating a naming processing unit 130e according to an embodiment.

FIG. 22 is a diagram illustrating a naming processing unit 130e according to an embodiment. The name processing unit 130e according to one embodiment includes a Chinese character name input processing unit 2010 and a Chinese character name's evaluation information generation unit 2020.

The naming processing unit 130e receives the first-country Chinese character name notation and the naming basic information, and outputs the Chinese character name's evaluation information. The name processing unit 130e may include a Chinese character name input processing unit 2010, and a Chinese character name's evaluation information generation unit 2020. Each of the blocks of the name processing unit 130e may correspond to a software processing block generated by executing a given computer program or application, and the software processing block may be variously defined according to an embodiment.

The Chinese character name input processing unit 2010 identifies the first-country Chinese character name notation based on the user input by the user terminal or the input unit. The Chinese character name input processing unit 610 may determine the first-country Chinese character name notation based on the computer character input tool in the first-country language based on the user input. In addition, the Chinese character name input processing unit 2010 may determine the first-country Chinese character name notation by removing or modifying blanks, special symbols, and the like from the user input according to a predetermined standard. In addition, the Chinese character name input processing unit 2010 defines, by item, the naming basic information input together with the first-country Chinese character name notation, and identifies the name evaluation's basic information for each item.

The Chinese character name input processing unit 2010 delivers the first-country Chinese character name notation and name evaluation's basic information to the Chinese character name's evaluation information generation unit 2020.

The Chinese character name's evaluation information generation unit 2020 generates Chinese character name's evaluation information based on the first-country Chinese character name notation and the name evaluation's basic information. The Chinese character name's evaluation information generation unit 2020 may generate the Chinese character name's evaluation information with reference to the database 140 in accordance with the Chinese character name's evaluation information generation process described above with reference to FIGS. 20 and 21.

The Chinese character name's evaluation information generation unit 2020 may generate the Chinese character name's evaluation information by referring to a database in the device or a database of an external server.

Figure 23:
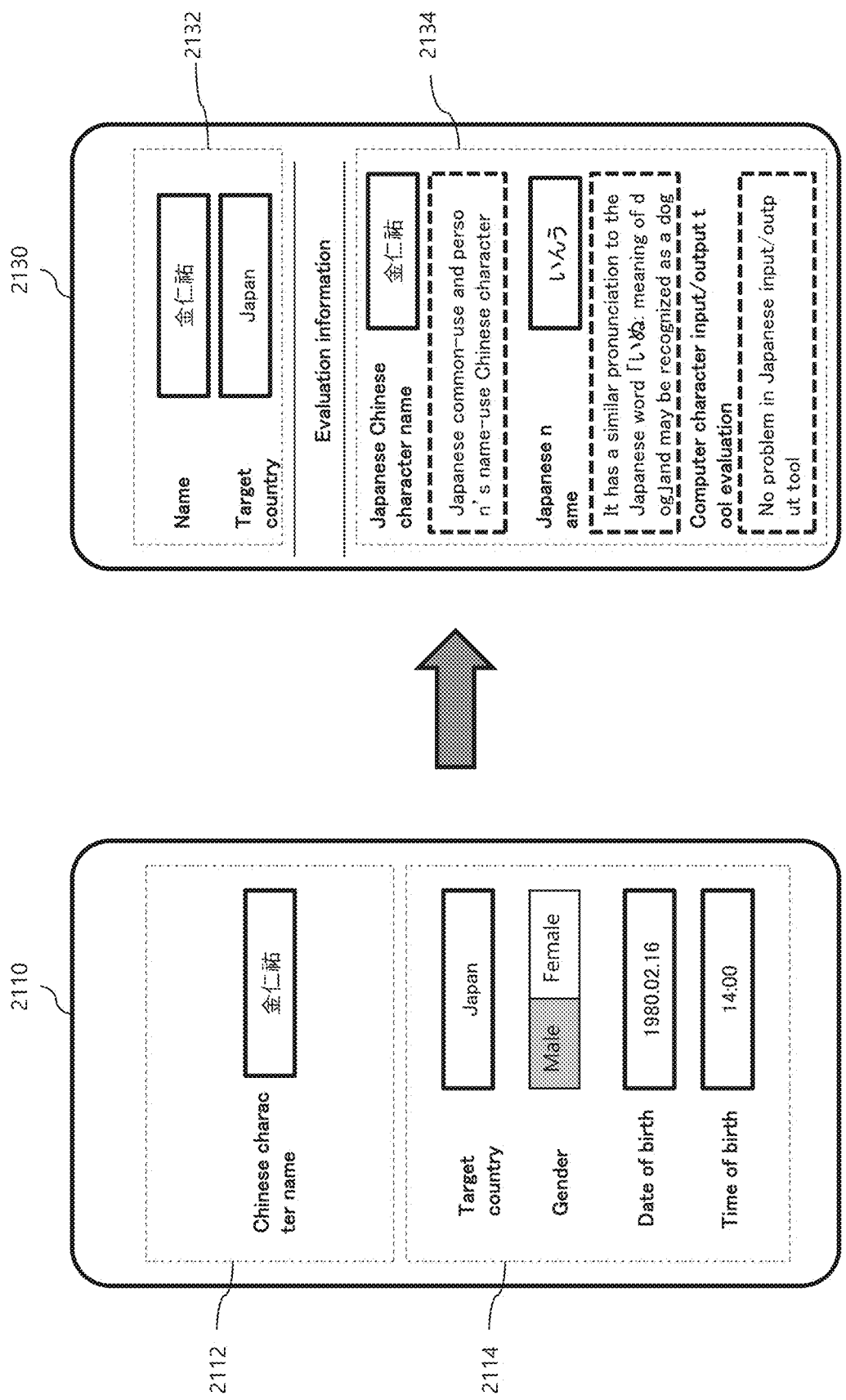
FIG. 23 is a diagram illustrating a GUI view for Chinese character name evaluation processing according to an embodiment.

FIG. 23 is a diagram illustrating a GUI view for Chinese character name evaluation processing according to an embodiment.

According to one embodiment, the naming system 100 provides an eleventh GUI view 2110 for receiving a first-country Chinese name notation and naming basic information via a GUI of a user terminal or electronic device. For example, the eleventh GUI view 2110 includes an eleventh area 2112 for receiving a first-country Chinese name notation and a twelfth area 2114 for receiving naming basic information. In the twelfth region 2114, for each input item, the mandatory input information and the optional input information can be displayed separately.

The naming system 100 provides a twelfth GUI view 2130 for outputting Chinese character name's evaluation information via a GUI of a user terminal or electronic device. The twelfth GUI view 2130 can display the first language name notation, the name evaluation's basic information, together with the Chinese character name's evaluation information. According to one embodiment, the twelfth GUI view 2130 may include a thirteenth area 2132 representing the information to be evaluated and a fourteenth area 2134 representing the Chinese character name's evaluation information. In the thirteenth region 2132, a combination of information to included in the first-country Chinese character name notation or the name evaluation's basic information may be displayed. In the fourteenth area 2134, a combination of information included in the Chinese character name's evaluation information can be displayed. For example, the fourteenth area 2134 may be co-displayed with Chinese character's usage aspect evaluation information, language evaluation information of the target country, computer character input/output tool evaluation information, nameology evaluation information, statute evaluation information, collective intelligence evaluation information, and the like, on a target country basis.

According to one embodiment, in the Chinese character name's evaluation information generation described with reference to FIGS. 19 to 23, it is also possible that the name evaluation's basic information generation processing and output are provided together. That is, it is possible to generate the name evaluation's basic information based on the first-country Chinese character name notation and the naming basic information, and to generate the Chinese character name's evaluation information based on the name evaluation's basic information. In addition, it is possible to output the name evaluation's basic information together in the twelfth GUI view 2130.

According to one embodiment, it is possible to receive the names of the first and second Chinese character cultured countries selected by the user, and to generate, in the processing unit, Chinese character information commonly used as person's names in the first and second countries, or Chinese character combination information commonly used as person's names in the first and second countries. In addition, the output unit may output the generated common person's name-use Chinese character information or common person's name-use Chinese character combination information. On the other hand, the disclosed embodiments may be implemented in the form of a computer-readable recording medium storing instructions and data executable by a computer. The instructions may be stored in the form of program code and, when executed by a processor, may generate a given program module to perform a given operation. Further, the instructions, when executed by a processor, may perform certain operations of the disclosed embodiments.

The disclosed embodiments have been described with reference to the accompanying drawings as above. It will be understood by those skilled in the art that the invention may be practiced in other forms than the disclosed embodiments without altering the technical idea or essential features of the invention. The disclosed embodiments are illustrative and should not be construed as limiting.

The invention claimed is:

1. An electronic device comprising a processing unit that receives first language name information input from a user, determines name evaluation's basic information about the first language name information, and generates and transmits name's evaluation information to an output unit based on a target language which includes at least one of a plurality of languages for the name evaluation's basic information,
    wherein the first language name information includes a name Chinese character notation,
    wherein the name evaluation's basic information includes the first language name information,
    wherein the name's evaluation information includes Chinese character's usage aspect evaluation information in another Chinese character cultured country for the name Chinese character notation,
    and wherein the Chinese character's usage aspect evaluation information includes at least one of the meaning of Chinese characters included in the Chinese character notation of a name, a meaning of Chinese characters, a pronunciation of Chinese character, a pronunciation of the combination of Chinese characters, a common-use Chinese character information, and a person's name-use Chinese characters information.

2. The electronic device as recited in claim 1, wherein the name evaluation's basic information further comprises at least one of the following information that does not overlap with the first language name information:
    i) pronunciation information of the first language name;
    ii) character notation information of the first language name;
    iii) pronunciation information of a second language name corresponding to i) or ii) above;
    iv) character notation information of a second language name corresponding to i) or ii) above.

3. The electronic device as recited in claim 1, wherein the processing unit is input with naming basic information and the naming basic information is included in the name evaluation's basic information, and
    the naming basic information includes at least one or a combination of a target language, a target country, a gender, a date of birth, and a time of birth.

4. The electronic device as recited in claim 1, wherein the name's evaluation information includes at least one of the meaning information of a word or a pronunciation difficulty, based on the voice pronunciation information of a combination of a name and a word used for calling the name, in at least one of a plurality of languages.

5. The electronic device as recited in claim 1, wherein the electronic device further includes a database storing at least one of language-by-language information for name evaluation or country-by-country language information,
    the processing unit generates the name's evaluation information based on the information stored in the database, and
    a user who adds data utilized for name evaluation to the database, or contributes to further evaluation or reliability evaluation of existing information of the database is given a monetary benefit or a benefit associated with the use of name evaluation services.

6. The electronic device as recited in claim 1, wherein the processing unit controls the output unit to request evaluation information for the name evaluation's basic information to a second client device when an evaluation request for the first language name information is received from a first client device, and
    output the name's evaluation information when the evaluation information is received from the second client device.

7. The electronic device as recited in claim 1, wherein the electronic device inputs name evaluation's basic information for first language name information received at the processing unit into a machine learning model learned using a set of training names and name's evaluation information associated with the training names, to obtain name's evaluation information based on at least one second language from the machine learning model.

8. An electronic device comprising a processing unit that receives first language name information input from a user, determines name evaluation's basic information about the first language name information, and generates and transmits name's evaluation information to an output unit based on a target language which includes at least one of a plurality of languages for the name evaluation's basic information,
    wherein the first language name information includes at least one of character notation information of the first language name, pronunciation information of the first language name, or desired information for the first language name,
    wherein the name evaluation's basic information includes the first language name information
    wherein the name's evaluation information includes at least one of language-by-language usage aspect evaluation information, computer character input/output tool evaluation information, or a name evaluation opinion input by another user, and
    wherein the language-by-language usage aspect evaluation information includes at least one of the meaning information of a word recognized by name evaluation's basic information or a pronunciation difficulty based on the target language.

9. The electronic device as recited in claim 8, wherein the name evaluation's basic information further comprises at least one of the following information that does not overlap with the first language name information:
    i) pronunciation information of the first language name;
    ii) character notation information of the first language name;
    iii) pronunciation information of a second language name corresponding to i) or ii) above;
    iv) character notation information of a second language name corresponding to i) or ii) above.

10. The electronic device as recited in claim 8, wherein the processing unit is input with naming basic information and the naming basic information is included in the name evaluation's basic information, and
    the naming basic information includes at least one or a combination of a target language, a target country, a gender, a date of birth, and a time of birth.

11. The electronic device as recited in claim 8, wherein the name's evaluation information includes at least one of the meaning information of a word or a pronunciation difficulty, based on the voice pronunciation information of a combination of a name and a word used for calling the name, in at least one of a plurality of languages.

12. The electronic device as recited in claim 8, wherein the electronic device further includes a database storing at least one of language-by-language information for name evaluation or country-by-country language information,
    the processing unit generates the name's evaluation information based on the information stored in the database, and
    a user who adds data utilized for name evaluation to the database, or contributes to further evaluation or reliability evaluation of existing information of the database is given a monetary benefit or a benefit associated with the use of name evaluation services.

13. The electronic device as recited in claim 8, wherein the processing unit controls the output unit to request evaluation information for the name evaluation's basic information to a second client device when an evaluation request for the first language name information is received from a first client device, and
    output the name's evaluation information when the evaluation information is received from the second client device.

14. The electronic device as recited in claim 8, wherein the electronic device inputs name evaluation's basic information for first language name information received at the processing unit into a machine learning model learned using a set of training names and name's evaluation information associated with the training names, to obtain name's evaluation information based on at least one second language from the machine learning model.

15. A naming system which controls method performed by an electronic device, the method comprising:
    receiving first language name information input from a user via an input unit;
    determining name evaluation's basic information about the first language name information by a processing unit; and
    generating name's evaluation information for the name evaluation's basic information based on a target language including at least one of a plurality of languages, and transmitting the name's evaluation information to an output unit by the processing unit,
    wherein the first language name information includes at least one of character notation information of the first language name, pronunciation information of the first language name, or desired information for the first language name,
    wherein the name evaluation's basic information includes the first language name information,
    wherein the name's evaluation information includes at least one of Chinese character's usage aspect evaluation information in another Chinese character cultured country for the name Chinese character notation, language-by-language usage aspect evaluation information, computer character input/output tool evaluation information, or a name evaluation opinion input by another user,
    wherein the Chinese character's usage aspect evaluation information includes at least one of the meaning of Chinese characters included in the Chinese character notation of a name, a meaning of Chinese characters, a pronunciation of Chinese character, a pronunciation of the combination of Chinese characters, a common-use Chinese character information, and a person's name-use Chinese characters information, and
    wherein the language-by-language usage aspect evaluation information includes at least one of the meaning information of a word recognized by name evaluation's basic information or a pronunciation difficulty based on the target language.

* * * * *